United States Patent
Mozayeni

(10) Patent No.: US 11,516,622 B2
(45) Date of Patent: Nov. 29, 2022

(54) WIRELESS COMMUNICATION MODES BASED ON MOBILE DEVICE ORIENTATION

(71) Applicant: Apple Inc., Cupertino, CA (US)

(72) Inventor: Robert S. Mozayeni, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 6 days.

(21) Appl. No.: 17/327,070

(22) Filed: May 21, 2021

(65) Prior Publication Data

US 2021/0281973 A1 Sep. 9, 2021

Related U.S. Application Data

(63) Continuation of application No. 16/665,565, filed on Oct. 28, 2019, now Pat. No. 11,026,051.

(60) Provisional application No. 62/879,975, filed on Jul. 29, 2019.

(51) Int. Cl.
| | |
|---|---|
| *H04B 5/00* | (2006.01) |
| *H04B 5/02* | (2006.01) |
| *H04W 8/00* | (2009.01) |
| *H04W 52/02* | (2009.01) |
| *H04W 4/02* | (2018.01) |
| *H04W 4/80* | (2018.01) |

(52) U.S. Cl.
CPC ............ *H04W 4/026* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 8,099,124 B2* | 1/2012 | Tilley | G06F 3/0346 455/90.1 |
| 8,254,984 B2 | 8/2012 | Kerr | |
| 8,275,412 B2* | 9/2012 | Alameh | H03K 17/945 455/556.1 |
| 8,543,415 B2* | 9/2013 | Venon | H04L 67/52 705/2 |
| 8,903,359 B2 | 2/2014 | Chen et al. | |

(Continued)

OTHER PUBLICATIONS

"Non-Final Office Action," dated Apr. 30, 2020 in U.S. Appl. No. 16/665,565. 8 pages.

(Continued)

*Primary Examiner* — Tuan A Tran
(74) *Attorney, Agent, or Firm* — Kilpatrick Townsend & Stockton LLP

(57) ABSTRACT

Wireless communications may be established between mobile computing devices via wireless protocols in asymmetric modes, using the orientation of the mobile devices to determine the asymmetric modes in which the mobile devices are operated. Requests may be received to initiate wireless communications using a wireless protocol that supports at least two asymmetric communication modes. The orientation of the mobile devices may be determined, and the asymmetric communication modes to be used by the mobile devices may be based on the orientations of the mobile device. Each mobile device may be configured to operate in the determined asymmetric communication mode of the wireless protocol, for establishing communications via the wireless protocol with other mobile devices.

20 Claims, 14 Drawing Sheets

(56) References Cited

U.S. PATENT DOCUMENTS

| | | | | |
|---|---|---|---|---|
| 8,682,399 | B2* | 3/2014 | Rabu | G01S 19/39 |
| | | | | 455/566 |
| 8,718,549 | B2 | 5/2014 | Hagedorn | |
| 8,886,124 | B2* | 11/2014 | Ohira | H04W 4/80 |
| | | | | 455/41.1 |
| 8,923,761 | B2* | 12/2014 | Hillan | H04B 5/00 |
| | | | | 428/41.3 |
| 9,001,047 | B2* | 4/2015 | Forstall | G06F 3/04883 |
| | | | | 345/173 |
| 9,072,052 | B2 | 6/2015 | Griffin et al. | |
| 9,083,811 | B2 | 7/2015 | Sharma et al. | |
| 9,351,144 | B2* | 5/2016 | Hillan | H04W 8/005 |
| 9,432,799 | B2* | 8/2016 | Kobayashi | H04W 84/10 |
| 9,467,556 | B2* | 10/2016 | Ahn | H04M 1/72466 |
| 9,635,162 | B2* | 4/2017 | Raynor | G06F 3/03543 |
| 9,940,827 | B2* | 4/2018 | Suomela | H04W 4/80 |
| 9,992,314 | B2* | 6/2018 | Beason | H04M 1/72448 |
| 9,996,825 | B1* | 6/2018 | Casey | G06Q 20/108 |
| 10,237,382 | B2 | 3/2019 | Hosoi et al. | |
| 10,244,098 | B2 | 3/2019 | Muthukumar | |
| 10,257,780 | B2* | 4/2019 | Khan | H04W 12/068 |
| 10,600,281 | B2* | 3/2020 | Sepich | G07F 17/3227 |
| 10,769,887 | B2* | 9/2020 | Soukup | G07F 17/3206 |
| 10,838,481 | B2* | 11/2020 | Khan | H04W 52/0254 |
| 10,878,414 | B2* | 12/2020 | Pillai | H04W 12/069 |
| 10,929,843 | B2* | 2/2021 | Khan | H04W 12/086 |
| 11,120,442 | B2* | 9/2021 | Hurley | G06Q 20/3229 |
| 11,178,124 | B2* | 11/2021 | Khan | H04L 63/061 |
| 11,386,424 | B2* | 7/2022 | Dicker | G06Q 20/3821 |
| 2005/0212749 | A1 | 9/2005 | Marvit et al. | |
| 2008/0254822 | A1* | 10/2008 | Tilley | G06F 3/0346 |
| | | | | 455/550.1 |
| 2009/0209293 | A1* | 8/2009 | Louch | H04M 1/72454 |
| | | | | 455/566 |
| 2009/0215439 | A1* | 8/2009 | Hamilton | H04M 1/605 |
| | | | | 455/418 |
| 2009/0265671 | A1* | 10/2009 | Sachs | G06F 3/0346 |
| | | | | 715/863 |
| 2011/0040962 | A1 | 2/2011 | Peyre | |
| 2011/0086626 | A1 | 4/2011 | Kerr | |
| 2012/0040608 | A1 | 2/2012 | Walker et al. | |
| 2013/0005242 | A1 | 1/2013 | Royston | |
| 2013/0053007 | A1* | 2/2013 | Cosman | G06F 3/017 |
| | | | | 455/414.3 |
| 2013/0079062 | A1 | 3/2013 | Hagedorn | |
| 2015/0327151 | A1 | 11/2015 | Hussain | |
| 2016/0021531 | A1 | 1/2016 | Kim et al. | |
| 2017/0311261 | A1* | 10/2017 | Mozer | H04W 52/0229 |

OTHER PUBLICATIONS

"Final Office Action," dated Oct. 21, 2020 in U.S. Appl. No. 16/665,565. 9 pages.

"Notice of Allowance," dated Feb. 3, 2021 in U.S. Appl. No. 16/665,565. 8 pages.

* cited by examiner

WIRELESS COMMUNICATION MODES BASED ON MOBILE DEVICE ORIENTATION

CROSS-REFERENCES TO RELATED APPLICATIONS

This application is a continuation of U.S. application Ser. No. 16/665,565, filed Oct. 28, 2019, entitled "Wireless Communication Modes Based On Mobile Device Orientation," which claims priority under 35 U.S.C. § 119(e) to U.S. Provisional Application No. 62/879,975, filed Jul. 29, 2019, entitled "Wireless Communication Modes Based On Mobile Device Orientation," the disclosures of which are incorporated by reference herein in their entirety.

BACKGROUND

Many different types of wireless network protocols have been implemented to support wireless communications between mobile devices, including device-to-device file transfers, Internet-of-Things (IoT) environments, remote device automation and control systems, and the like. Different wireless protocols may have different characteristics based on their network infrastructures, the network layers in which they operate, and the capabilities and requirements of the protocols. For instance, wireless protocols may differ significantly with respect to transmission ranges, data transfer rates, power consumption requirements, security/encryption capabilities, etc. However, regardless of the different characteristics of wireless protocols, there may be similarities in the techniques used to establish wireless connections and transmit data between devices.

To establish a wireless connection between mobile devices, using any number of different wireless protocols, a first mobile device may generate and transmit an initial communication to a second mobile device. In some cases, the initial communication may contain the data to be transferred to the second mobile device. For example, in the near field communication (NFC) wireless protocol used for short-range wireless data transfers, a first device may generate a magnetic field modulated with the information to be transferred. The magnetic field generated by the first device may inductively couple onto a second device that is located near the first device, and the second device may respond by generating its own modulated magnetic field to be inductively coupled to the first device. In other cases, the initial communication from the mobile device may correspond to a request for a connection or session, and may include information such as device identifiers, header information, protocol or encryption details, etc. For example, in a secure Bluetooth wireless protocol, the first device may transmit an initial pairing request, and the second device may reply with a pairing response, after which the devices may generate and exchange encryption keys and proceed with the data transfer via a secure connection.

Certain wireless protocols may support symmetric and/or asymmetric communication modes for establishing wireless connections between mobile devices. When a mobile device is operating in a symmetric communication mode of a wireless protocol, the device may transmit/generate communications to other mobile devices while simultaneously listening for communications from other mobile devices to establish connections. In contrast, when a mobile device is operating in an asymmetric communication mode of a wireless protocol, the device may either transmit/generate communications or listen for communications from other devices, but would not simultaneously transmit/generate communications and listen for communications. Thus, mobile devices operating in symmetric communication modes of a wireless protocol may be able to establishing wireless connections more quickly, by simultaneously broadcasting to and listening for other mobile devices. However, symmetric communication modes for certain wireless protocols also may have certain disadvantages with respect to processing overhead and network/device security.

BRIEF SUMMARY

Techniques are described herein for establishing wireless communications between mobile computing devices via wireless protocols in asymmetric modes, using the orientation of the mobile devices to determine the asymmetric modes in which the mobile devices are operated. In some embodiments, requests may be received to initiate wireless communications using a wireless protocol that supports at least two asymmetric communication modes. Asymmetric communication modes of a wireless protocol may include, for example, a broadcasting mode and a listening mode. The orientation of a mobile device may be determined, and the asymmetric communication mode to be used by the mobile device may be based on its orientation. The mobile device then may be configured to operate in the determined asymmetric communication mode of the wireless protocol, for establishing communications via the wireless protocol with other mobile devices.

Additional techniques are described for performing mode-switching cycles, in which a mobile device may be iteratively reconfigured between operating in different asymmetric communication modes of the wireless protocol, thereby enabling wireless communications to be established more efficiently between mobile devices. For example, two different mobile devices each may be cycled between a broadcasting mode and a listening mode, thereby allowing the two devices to quickly establish communications during a time when the devices are operating in different asymmetric communication modes of the wireless protocol. In some embodiments, each mobile device may determine a frequency for a mode-switching cycle, and a cycle start time including a time offset based on the orientation of the device. Each mobile device may switch between the asymmetric communication modes of the wireless protocol, beginning at the offset cycle start time and switching iteratively according to the frequency, until communications are established with a device in a different asymmetric communication mode. In various examples, different ranges of possible orientations of the mobile device may be assigned to different communication modes, or a time offset value may be calculated based on the angular distance between the orientation of the mobile device and a predetermined fixed heading. Additionally, in certain embodiments, if the mobile device has not established wireless communications with another device after a predefined threshold time or threshold number of cycles, then the mobile device may automatically modify its offset cycle start time and continue the mode-switching cycle using the modified offset time.

These and other embodiments of the disclosure are described in detail below. For example, other embodiments are directed to systems, devices, and computer readable media associated with methods described herein.

A better understanding of the nature and advantages of embodiments of the present invention may be gained with reference to the following detailed description and the accompanying drawings.

DETAILED DESCRIPTION

Figure 1:
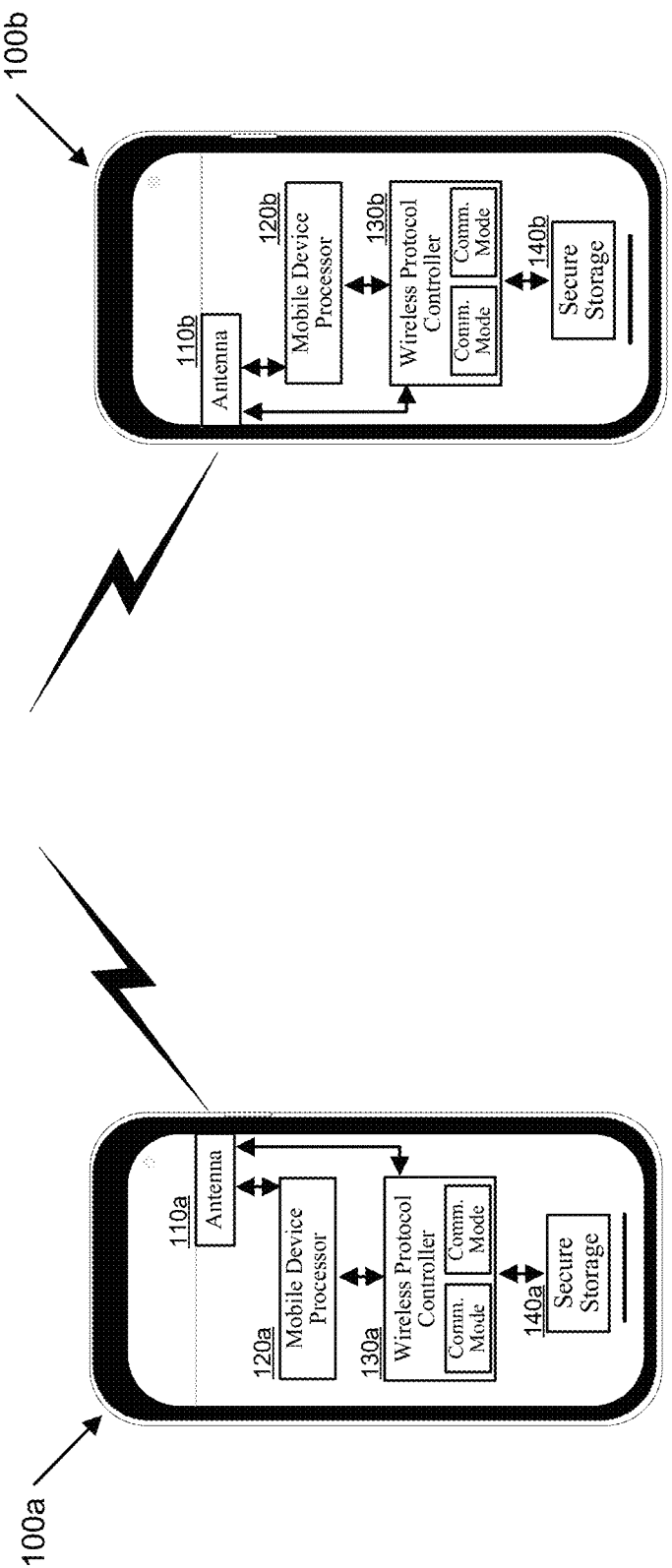
FIG. 1 shows an example of two mobile devices configured to communicate via a wireless protocol according to embodiments of the present disclosure.

Aspects of the present disclosure provide various techniques (e.g., methods, systems, devices, computer-readable media storing computer-executable instructions used to perform computing functions, etc.) for establishing wireless communications (e.g., connections or other connectionless communication sessions) between mobile computing devices via wireless protocols in asymmetric modes, using the orientation of the mobile devices to determine the asymmetric modes in which the mobile devices are operated. In the various embodiments and examples described herein, requests may be received to initiate wireless communications using a wireless protocol that supports at least two asymmetric communication modes. The orientation of a mobile device may be determined, and the asymmetric communication mode to be used by the mobile device may be based on its orientation. The mobile device may operate in the determined asymmetric communication mode of the wireless protocol, for establishing communications via the wireless protocol with other mobile devices.

Additional techniques are described herein for performing mode-switching cycles, in which a mobile device may be iteratively reconfigured between operating in different asymmetric communication modes of the wireless protocol. For example, a mobile device may be cycled between a broadcasting mode and a listening mode, during which the device may establish communications with another device operating in the other asymmetric communication modes. In some embodiments, each mobile device may determine a frequency for a mode-switching cycle, and a cycle start time including a time offset based on the orientation of the device. In some cases, it might not be necessary for the mobile device to determine cycle start time. Rather, the current mode may be determined based on the current time and current heading only, assuming that a clock within the mobile device is synchronized with the clock of the other device. Each mobile device may switch between the asymmetric communication modes of the wireless protocol, beginning at the offset cycle start time and switching iteratively according to the frequency, until communications are established with another device operating in the other asymmetric communication mode. In some cases, different ranges of possible orientations of the mobile device may be assigned to different communication modes, while in other cases a time offset value may be calculated based on the angular distance between the orientation of the mobile device and a predetermined fixed heading. Additionally, in certain embodiments, if the mobile device has not established wireless communications with another device after a predefined threshold time or threshold number of cycles, then the mobile device may automatically modify its offset cycle start time and continue the mode-switching cycle using the modified offset time.

I. Mobile Device Communications Using Wireless Protocols

Various embodiments herein relate to wireless network communications (e.g., connections and/or data transfers) between mobile devices. The wireless connections and data transfers described in these examples may be performed using various different wireless network protocols. Different wireless protocols may have different characteristics and may support different types of communications between mobile devices. For example, certain wireless protocols may apply to short-range transmissions only, while only wireless protocols may be used for medium-range and long-range transmissions. Additionally, certain wireless protocols may operate on cellular telecommunication networks, while others operate on local area networks (LANs) and/or wide area networks (WANs) via IP-based communication, and still others operate over on network infrastructures (e.g., cable or satellite) and others operate on different network layers (e.g., medium access control (MAC) layer, application layer, etc.). As another example, certain wireless protocols may be designed for low-power (or even non-powered) devices, while other wireless protocols may require relatively high-powered mobile devices. By way of example only, the types of wireless protocols and technologies that may be used in the various embodiments and examples described herein may include near field communication (NFC), Ultra Wideband (UWB), radio frequency identification (RFID), Message Queue Telemetry Transport (MQTT), Data Distribution Service (DDS), Advanced Message Queuing Protocol (AMQP), Bluetooth, ZigBee, Wi-Fi, cellular (e.g., GSM, 3G, 4G, 5G, LTE), Long Range Wide Area Network (LoRaWAN), and Narrowband IoT (NB-IoT), among others.

Using one or more wireless protocols, mobile devices may communicate with other mobile devices, non-mobile computing devices, and/or other physical objects such as NFC or RFID smart tags. Wireless communications may be used to implement a broad range of technologies, including device-to-device file transfers, contact sharing, media streaming, Internet-of-Things (IoT) systems, remote device automation and control, etc. Additionally, although certain examples are described below in terms of specific types of wireless protocols, such as near field communication (NFC), Ultra Wideband (UWB), and Bluetooth, it should be understood that the techniques described herein are not limited to any specific wireless protocols, but may be applied to any wireless protocols by which connections are established or data is transferred between mobile devices.

FIG. 1 shows an example of two mobile devices configured to communicate via a wireless protocol according to embodiments of the present disclosure. In this example, mobile devices 100a and 100b (which may be referred to individually or collectively as mobile device(s) 100), include similar components configured to support wireless communications via one or more wireless protocols. Mobile devices 100a and 100b include antennas 110a and 100b for transmitting/receiving wireless communications, mobile device processors 120a and 120b, wireless protocol controllers 130a and 130b, and secure storages 140a and 140b.

The components of the example mobile devices 100 are described in general terms, but may be structured and implemented differently depending on which wireless protocols are supported by mobile devices 100 in different embodiments. For example, when communicating via the near field communication (NFC) short-range wireless protocol, antennas 110a and 100b may correspond to two loop antennas configured to generate magnetic fields and inductively couple to magnetic fields generated by other devices. When using NFC, controllers 130a and 130b may correspond to NFC controllers, which may support multiple communication modes, including a peer-to-peer symmetric communication mode, a tag mode (or asymmetric listening mode), and a scanning mode (or asymmetric broadcasting mode). Secure storage elements 140a and 140b may be, for example, SIM cards or embedded secure elements.

A. Example of General Wireless Communications Using Wireless Protocols

Figure 2B:
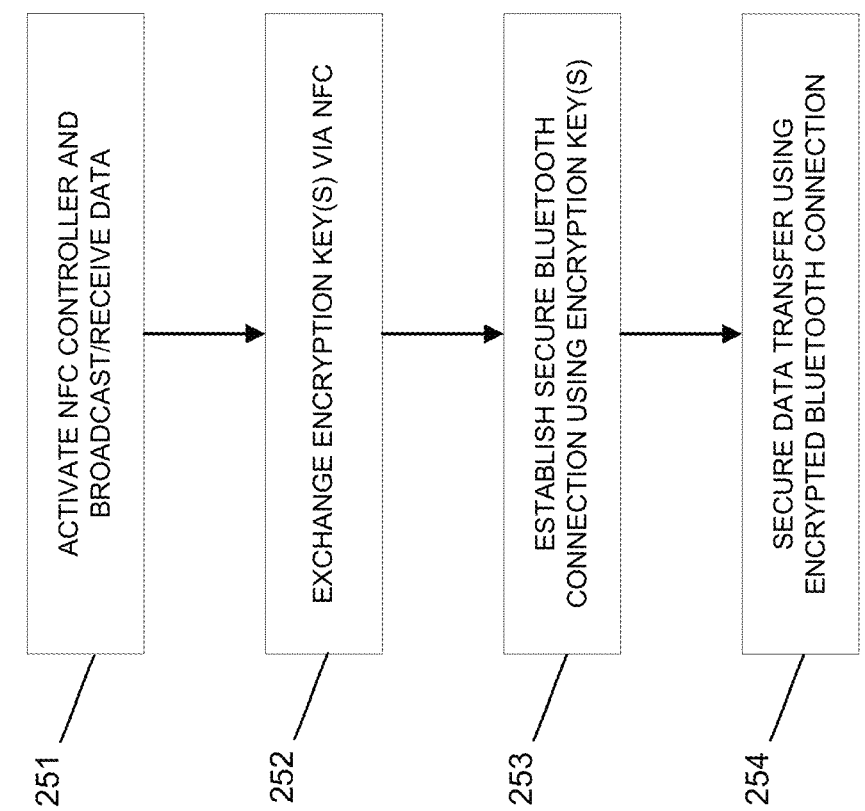
FIGS. 2A and 2B are flowcharts illustrating methods for performing a data transfer between mobile devices using a wireless protocol according to embodiments of the present disclosure.
Figure 2A:
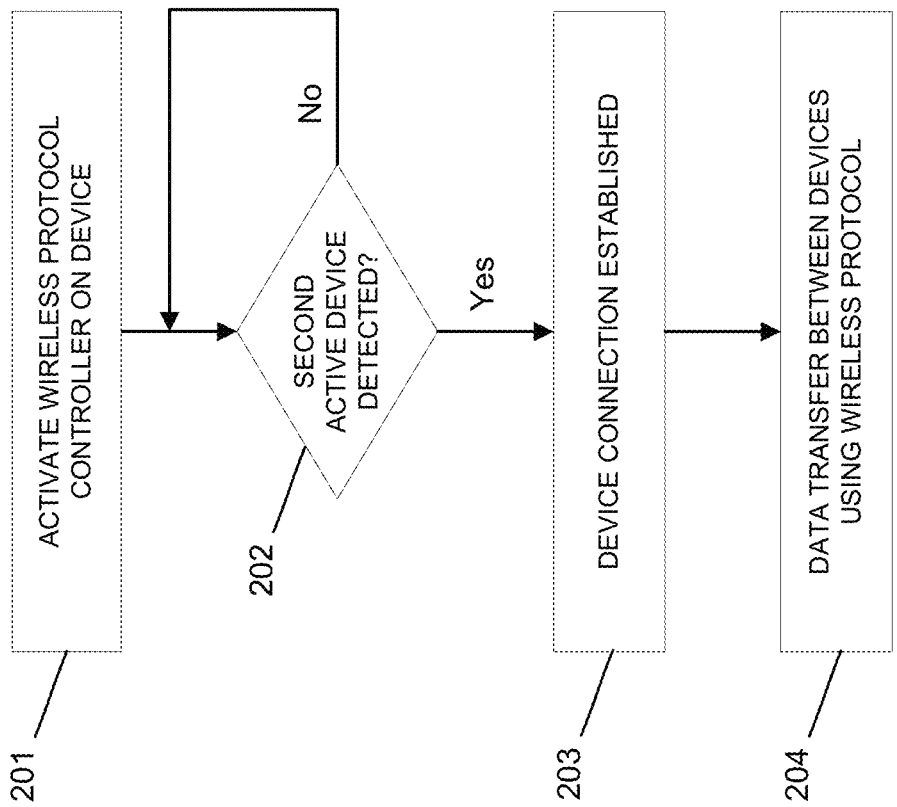

FIG. 2A is a flowchart illustrating a method for performing a data transfer between mobile devices using a wireless protocol according to embodiments of the present disclosure. The steps in this example method may be performed by either or both of mobile devices 100, and these steps may be general to multiple types of wireless protocols. In step 201, the wireless protocol controller 130 on a mobile device 100 may be activated. In some embodiments, a single mobile device 100 may include multiple different controllers 130, each configured to support different types of wireless protocols (e.g., an NFC controller, Bluetooth controller, WiFi controller, etc.). The wireless protocol controllers 130 in a mobile device 100 may be activated and de-activated based on commands from a user (e.g., by setting and unsetting airplane mode, turning on and off WiFi, Bluetooth, etc.), or programmatically based on instructions from the mobile operating system and/or mobile applications installed on the device 100.

In step 202, the mobile device 100 may attempt to detect one or more other mobile devices 100 capable of communicating via the same wireless protocol. Depending on the wireless protocols used, step 202 may include generating/transmitting a broadcast message to any device in range, or may include communications specifically targeted to one other mobile device 100. Step 202 may include an initial request send via the wireless protocol controller 130 to detect other devices within the network having activated controllers 130 compatible with the same wireless protocol. However, in NFC and other short-range technologies, the attempt to detect in step 202 may include generating and emitting a magnetic field including the data to be transferred.

In step 203, the mobile device 100 may receive a response sent from a second mobile device, and wireless communications may be established between the mobile devices 100 using the wireless protocol. For some wireless protocols, such as NFC, step 203 may be optional and a device-to-device connection need not be expressly established before transferring data between the devices. In other examples, step 203 may include pairing devices, initiating a WiFi connection, etc.

In step 204, the connected mobile devices 100 may exchange data, either via a one-way or two-way transmission channel. As noted above, the characteristics of the data transfer in step 204, including one-way or two-day, data rate, network types, transmission range, etc., may vary significantly depending on the characteristics of the mobile devices 100 and the wireless protocol being used.

B. Example of Secure Wireless Communications Using NFC and Bluetooth

As discussed above in FIG. 2A, steps 201-204 illustrate a generalized process for establishing a wireless connection and/or wireless data transfer that may apply to multiple wireless protocols. However, there may be unique differences for each different wireless protocol in how (and if) wireless communications are established, and in how data is transferred between the mobile devices 100. Further, in some embodiments, multiple different wireless protocols may be used in combination to perform a wireless data transfer process, as illustrated by the example below in FIG. 2B.

FIG. 2B is a flowchart illustrating a method for performing a data transfer between mobile devices, using the near field communication (NFC) and secure Bluetooth wireless protocols, according to embodiments of the present disclosure. In step 251, mobile devices 100a and 100b may activate their NFC controllers 130a and 130b, using either a symmetric (e.g., bi-directional) or an asymmetric (e.g., unidirectional) communication mode for broadcasting and/or receiving data via the short-range NFC network. In step 252, the mobile devices 100a and 100b may exchange encryption keys via NFC. The encryption keys exchanged in step 252 may be, for example, randomly generated shared keys, or the individual public keys of the mobile devices 100a and 100b. Thus, in at least some embodiments, it may be assumed that mobile devices 100a and 100b have not previously exchanged keys and do not have an existing relationship to secure the exchange of the data.

In step 253, mobile devices 100a and 100b may establish a secure Bluetooth connection using the encryption keys exchange via NFC in step 252. Then, in step 254, the mobile devices 100a and 100b may transfer data using the secure encrypted Bluetooth connection. The data transfers in step 254 may be unidirectional or bi-directional, and may include secure device-to-device file transfers, contact sharing, or any other encrypted data transfer. The secure data transfers described in FIG. 2B may include technical advantages over conventional techniques, including improved data security. For example, by exchanging encryption keys using a first wireless protocol (e.g., NFC) which is difficult to passively monitor, and then using those encryption keys by a second wireless protocol (e.g., Bluetooth) configured to support secure data transfer, wireless communications and data transfers may be performed more securely between mobile devices 100 with no previous existing relationships for securely transferring data.

II. Asymmetrical Modes to Establish Wireless Communications

Wireless protocols may support symmetric and/or asymmetric communication modes for establishing communications and performing data transfers. As used herein a symmetric communication mode may refer to the capability of operating in a broadcasting mode by broadcasting data via a wireless protocol, while simultaneously operating in a listening mode by scanning for and receiving communications from other mobile devices via the wireless protocol. Thus, a symmetric communication mode also may be referred to as a bi-directional communication mode. For example, within the near field communication (NFC) wireless protocol, peer-to-peer mode may be a symmetric communication mode during which NFC mobile devices 100 may exchange data with other NFC mobile devices 100. In contrast, an asymmetric communication mode may refer to the capability of either operating in a broadcasting mode by broadcasting data via the wireless protocol, or operating in a listening mode by scanning for and receiving communications from other mobile devices via the wireless protocol, but not simultaneously operating in the broadcasting mode and listening mode. Thus, an asymmetric communication mode also may be referred to as a unidirectional communication mode. For example, within the near field communication (NFC) wireless protocol, reader/writer mode may be a broadcasting asymmetric communication mode, while card emulation mode may be a listening asymmetric communication mode. In NFC, the reader/writer may be considered the broadcaster or a listener. For example, if a reader/writer device is reading a tag, the tag may be supplying the information, but the reader/writer device may be supplying the energy to read the tag. Thus, depending on whether "broadcasting" is considered in terms of the direction of information flow, or the direction of electromagnetic energy, a reader/writer device may be considered a broadcaster or a listener. However, regardless of the terminology used for the different asymmetric communication modes, the techniques described herein apply to establish communication sessions between mobile computing devices operating in asymmetric modes, by using the orientation of the mobile devices to determine/set different asymmetric modes for operating the mobile devices.

As noted above, mobile devices operating in symmetric communication modes may potentially establish wireless communications and transfer data between devices more quickly, by simultaneously broadcasting to and listening for other mobile devices. However, symmetric communication modes might not be supported by all wireless protocols. Asymmetric communication modes also may be preferred in some embodiments, even when a symmetric communication mode is supported. For instance, asymmetric communication modes may provide potential technical advantages with respect data/network security and processing overhead. However, as illustrated in FIGS. 3A-3B, mobile devices using asymmetric communication modes may encounter difficulties in establishing wireless communications and performing data transfers.

Figure 3A:
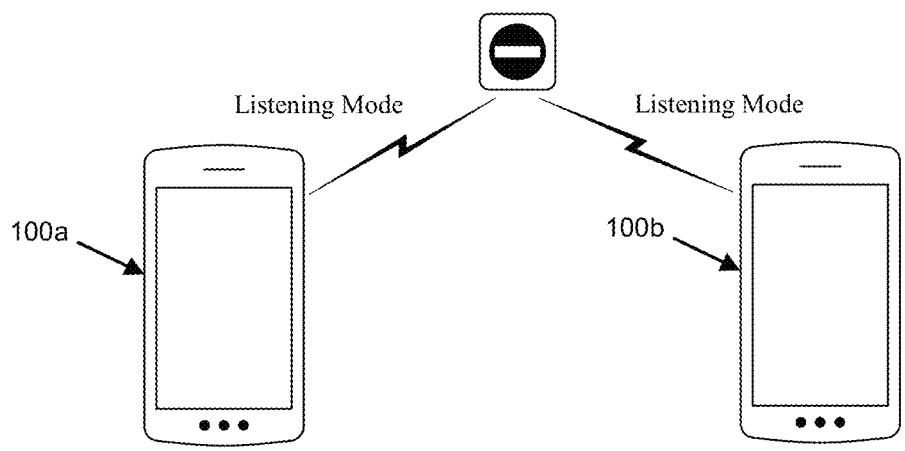
FIGS. 3A-3C are diagrams illustrating wireless communication attempts between mobile devices operating in asymmetric communication modes according to embodiments of the present disclosure.
Figure 3B:
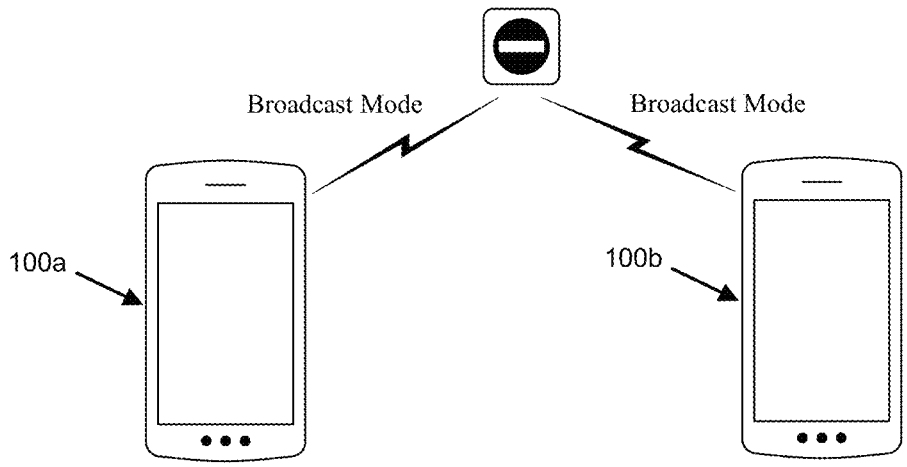
Figure 3C:
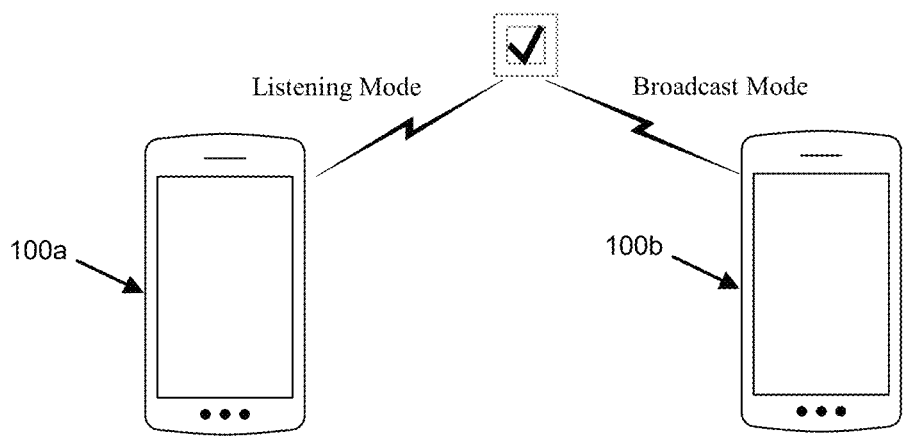

FIGS. 3A-3C are diagrams illustrating wireless communication attempts between mobile devices operating in asymmetric communication modes according to embodiments of the present disclosure. In FIG. 3A, both mobile devices 100a and 100b are operating in an asymmetric listening mode of the wireless protocol. Accordingly, because neither device in FIG. 3A is broadcasting, the devices might not detect one another and thus might not be able to successfully establish a connection or communicate data. In FIG. 3B, both mobile devices 100a and 100b are operating in an asymmetric broadcasting mode of the wireless protocol. Because both devices in FIG. 3B are broadcasting, and neither device is configured to listen to the broadcasts of the other device, these devices also might not detect one another and might not be able to successfully establish a connection or communicate data. However, in FIG. 3C, mobile device 100a is operating in an asymmetric listening mode and device 100b is operating in an asymmetric broadcasting mode. Thus, assuming that the devices 100a and 100b are on the same network and/or within range of each other, and assuming that devices 100a and 100b stay in their respective asymmetric modes for a sufficient period of time, the devices 100a and 100b may successfully establish a wireless connection and communicate data.

Figure 4B:
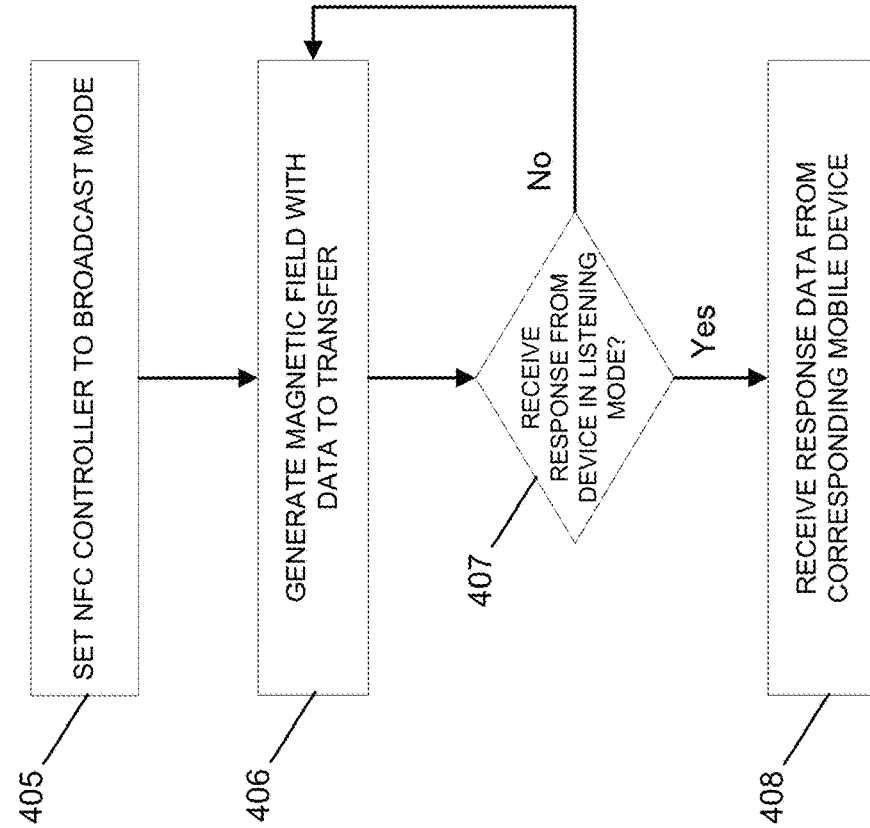
FIGS. 4A and 4B are flowcharts illustrating methods for operating a mobile device in two different asymmetric communication modes of the NFC wireless protocol, according to embodiments of the present disclosure.
Figure 4A:
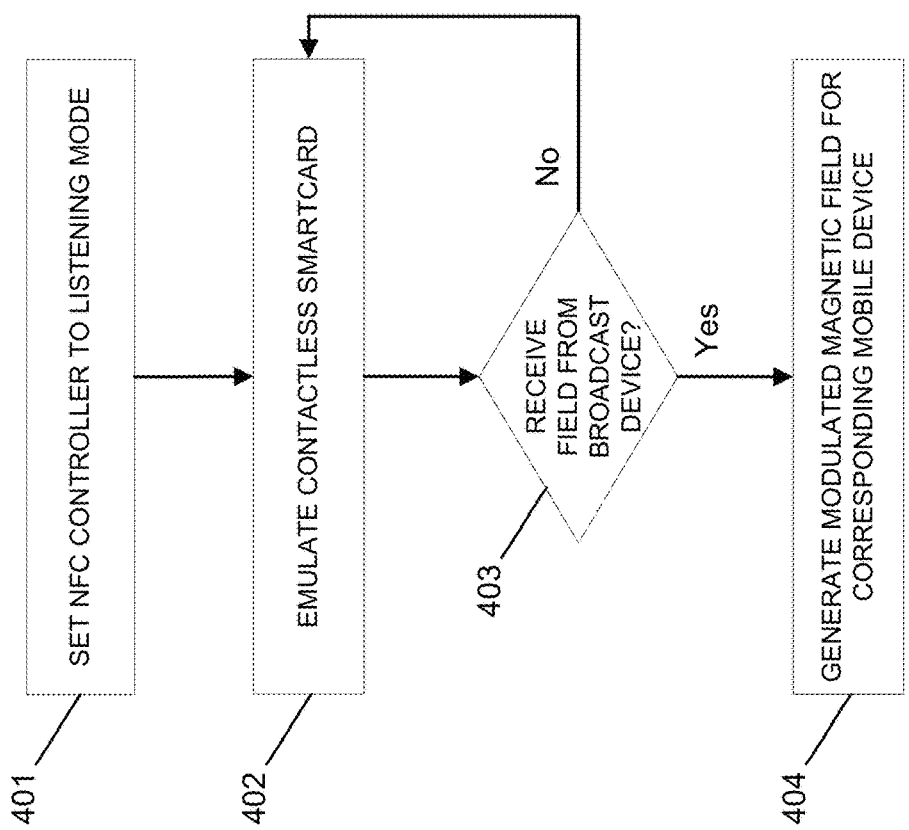

FIGS. 4A and 4B are flowcharts illustrating methods for operating a mobile device in two different asymmetric communication modes of the NFC wireless protocol, according to embodiments of the present disclosure. As shown in this example, FIG. 4A corresponds to a process performed by an NFC device operating in an asymmetric listening mode (e.g., mobile device 100a in FIG. 3C), and FIG. 4B corresponds to a process performed by an NFC device operating in an asymmetric broadcasting mode (e.g., mobile device 100b in FIG. 3C).

In step 401, the NFC controller 130a in mobile device 100a may be set to an asymmetric listening mode. As noted above, the activation of a wireless protocol controller 130 and setting the communication mode may be performed in response to a user action on the mobile device 100a, or programmatically based on instructions from the mobile operating system and/or mobile applications installed on the device 100a. In steps 402 and 403, the mobile device 100a may operate in the asymmetric listening mode, which for the NFC wireless protocol may correspond to a card emulation mode. Within NFC card emulation mode, the mobile device 100a operates the same as a contactless smart card, and in some embodiments NFC-enabled mobile devices 100 may emulate multiple different smart cards at the same time. In step 404, if the mobile device 100a has received a modulated magnetic field from another mobile device 100b, the mobile device 100a may exit listening more and inductively couple the modulated magnetic field to receive the information from the broadcasting mobile device 100b. In some cases, the mobile device 100a also may be generating a different modulated magnetic field to be inductively coupled to the first device. In some embodiments, a contactless smart card may be either be read from or written to in a given session.

Steps 405-408 in FIG. 4B represent steps that may be performed by an NFC device operating in an asymmetric broadcasting mode, which for the NFC wireless protocol may correspond to a reader/writer mode. For mobile devices 100 operating in asymmetric communication modes, these steps may be performed by a different mobile device 100b than the mobile device 100a performing steps 401-404.

Alternatively, steps 401-404 and steps 405-408 may be performed by the same NFC-enabled mobile device 100, but at different times (e.g., after a mode-switching operation). In step 405, the NFC controller 130b in mobile device 100b may be set to an asymmetric broadcasting mode (e.g., NFC reader-writer mode). As noted above, the activation of a wireless protocol controller 130 and setting the communication mode may be performed in response to a user action or programmatically by the mobile operating system and/or mobile applications installed on the device 100b. In steps 406 and 407, the mobile device 100b may operate in the asymmetric broadcasting mode, which for the NFC wireless protocol includes generating a modulated magnetic field that includes the data to be transmitted. In step 408, if the mobile device 100b has received a response to its modulated magnetic field from another mobile device 100a, the mobile device 100b may exit broadcasting mode and receive response data (via a modulated magnetic field) from the corresponding mobile device 100a.

III. Mobile Device Orientation to Determine Asymmetric Mode

When a mobile device 100 is configured to operate in an asymmetric mode of a wireless network protocol, the mobile device 100 may be incapable of simultaneously broadcasting signals to other mobile devices while also listening for signals from other mobile devices. For example, when operating in an asymmetric broadcasting mode, a mobile device 100 might only generate or transmit a signal and may be unable to receive incoming signals. Conversely, when operating in an asymmetric listening mode, the mobile device 100 might only be configured to receive incoming signals and may be unable to generate or transmit signals to other mobile devices. As illustrated above in FIGS. 3A-3B, mobile devices 100 using asymmetric communication modes may encounter difficulties in establishing wireless connections and performing data transfers. If two mobile devices 100a and 100b are operating within the same asymmetric mode, they may be unable to detect the other device and/or to establish a connection or transfer data between devices. Instead, the mobile devices 100a and 100b may be required to operate in different asymmetric communication modes, for at least minimum amount of time, to allow the devices to detect one another and establish a connection or initiate a data transfer.

Accordingly, certain aspects described herein include using the orientation of a mobile device 100 to determine the asymmetric communication mode in which the mobile device 100 operates. In various embodiments, technical advantages may be realized when using mobile device orientations to determine the asymmetric communication modes. For example, two different mobile devices 100 have synchronized clocks and are running similar processes for selecting an asymmetric communication mode, the typical outcome may be that the mobile devices 100 will select the same asymmetric communication mode, resulting in incompatible modes in which the devices 100 are unable to establish a connection or transfer data between devices. In contrast, when using the orientations of the mobile devices 100, two mobile devices 100 having synchronized clocks and running similar or identical processes may nonetheless select different asymmetric communication modes. Additionally, in common usage scenarios such as when two different mobile devices 100 are facing one another to establish a connection or perform a data transfer, an orientation-based determination may cause the mobile devices 100 to select different asymmetric communication modes which may allow the devices to more quickly establish connections and initiate data transfers.

Figure 5:
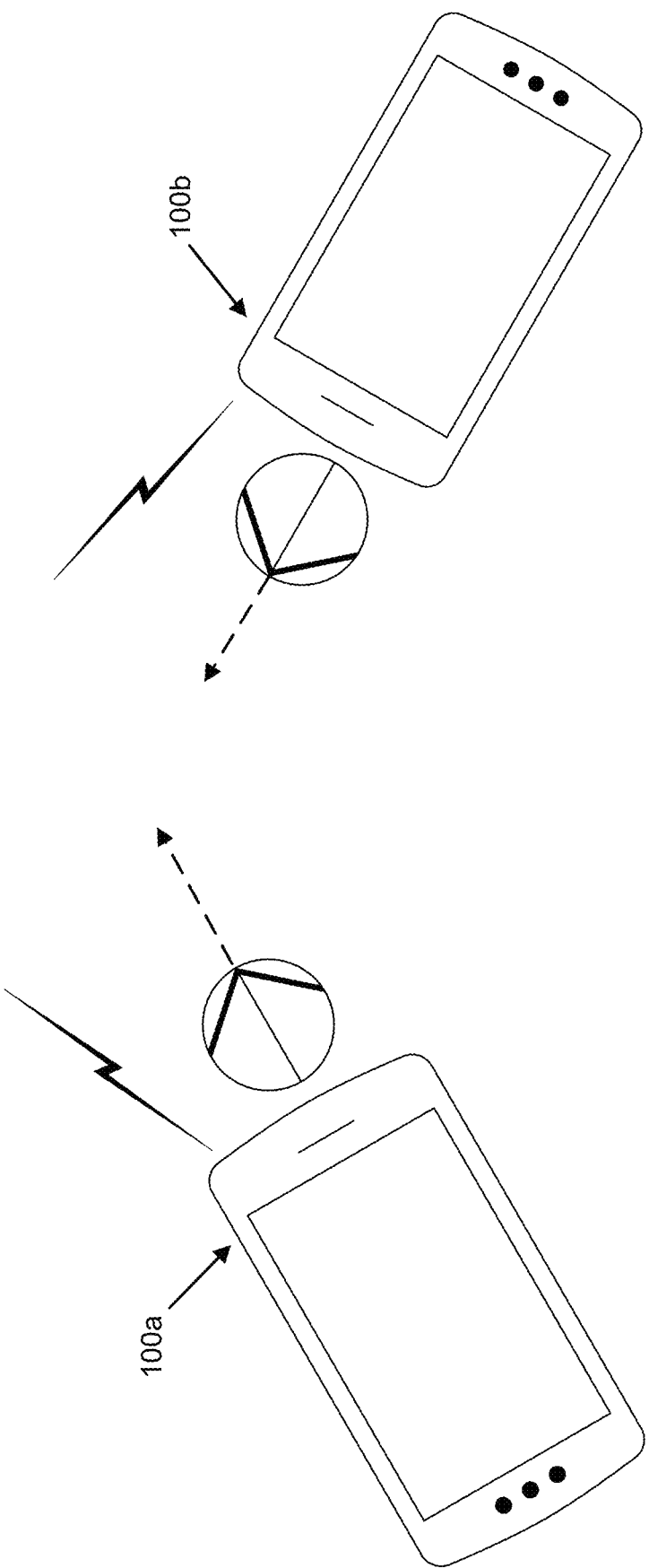
FIG. 5 shows an example of two mobile devices configured to communicate via asymmetric communication modes of a wireless protocol, based on the orientation of the devices, according to embodiments of the present disclosure.

FIG. 5 shows an example of two mobile devices configured to communicate via asymmetric communication modes of a wireless protocol, based on the orientation of the devices, according to embodiments of the present disclosure. In FIG. 5, two mobile devices 100a and 100b are shown generally facing one another, and thus devices 100a and 100b in this example have generally opposite orientations. In some cases, the respective orientations of mobile devices 100a and 100b may indicate that different users are holding mobile devices 100a and 100b and facing each other while attempting to establish a connection or perform a data transfer.

Figure 6:
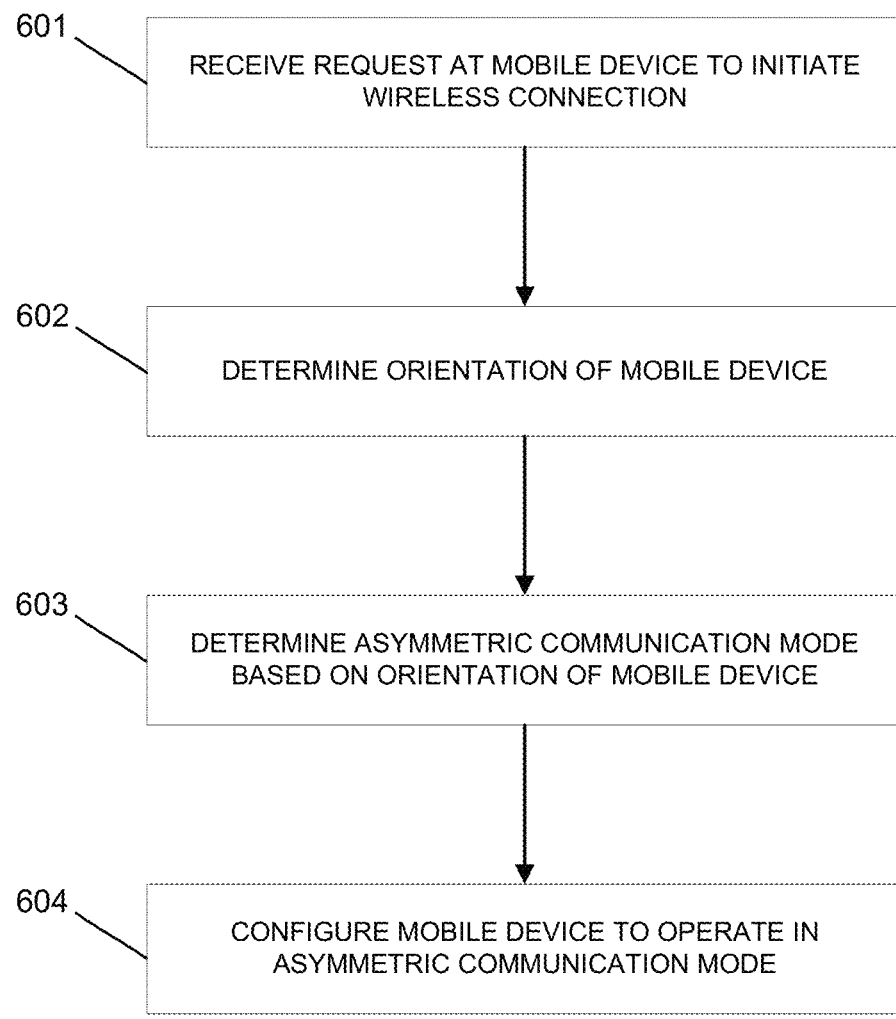
FIG. 6 is a flowchart illustrating a method for configuring a mobile device to operate in an asymmetric communication mode based on the orientation of the device, according to embodiments of the present disclosure.

FIG. 6 is a flowchart illustrating a method for configuring a mobile device to operate in an asymmetric communication mode based on the orientation of the device, according to embodiments of the present disclosure. As discussed below, the process described in FIG. 6 may be performed independently by different mobile devices 100a and 100b, for example, within the wireless protocol controllers 130 of the devices 100.

In step 601, a request may be received by the mobile device 100 to initiate a wireless connection and/or wirelessly data transfer. The request in step 601 may be initiated by a user of the wireless device 100 in some examples. For instance, a user of a smartphone mobile device 100 may perform a "bump" to initiate a transfer of contacts or pictures to a nearby device, or may initiate a device search/pairing function to be used for file transfers, data sharing, etc. In other examples, the request in step 601 may correspond to a command from the mobile operating system of the device 100, or from a mobile application installed on the device 100, and may be received and handled without any user interaction. In still other examples, the request in step 601 may be a request from another wireless device requesting to establish a connection and/or transfer data to/from the mobile device 100.

In step 602, in response to the request in step 601, the current orientation of the mobile device 100 may be determined. In various embodiments, the orientation determination in step 602 may be an absolute orientation reading, or an orientation reading relative to a predetermined fixed heading (e.g., magnetic north) or relative to another mobile device. In some embodiments, the orientation determination may be a 2-axis orientation which may be unaffected by any up-down tilt of the mobile device 100. In other embodiments, a 3-axis orientation may be determined for the mobile device 100, for example, based on a combination of magnetic sensors and a tilt sensor to measure a gravity vector.

In some embodiments, to determine the orientation of the mobile device 100, the wireless protocol controller 130 may retrieve an orientation reading from an internal compass of the mobile device 100. In some cases, data from compass sensors within a mobile device 100 may be retrieved and analyzed in conjunction with other movement sensors within the mobile device 100 (e.g., gyroscope, accelerometer, etc.). For example, if a compass reading was recently taken at the mobile device 100, and the movement sensors indicate that the device has not moved since the last compass reading, then it may be unnecessary to retrieve a new compass measurement in step 602. In other examples, multiple compass measurements may be taken at and around the time of the request in step 601, and the compass measurements may be analyzed and corrected to account for interference or other compass errors.

Instead of, or in addition to, using an internal compass to determine the orientation of the mobile device 100, other orientation techniques may be used in other examples. For instance, in some embodiments, a mobile device may include ranging circuitry that can determine the relative distance between mobile devices. For example, time-of-flight measurements can be performed using ultra-wideband (UWB) pulses transmitted between two mobile devices 100a and 100b. The ranging may provide distance information, which can be used to determine a relative position of the mobile devices 100a and 100b, for example, distances and/or an angular (orientation) differences between the two devices. For instance, mobile devices 100a and 100b may include ultra-wideband (UWB) antennas and UWB circuitry configured to perform ranging. The UWB antennas may detect signals and the UWB circuitry may analyze the detected signals. In some embodiments, mobile devices 100 may include three or more UWB antennas to support triangulation. The different UWB antennas may have different orientations, for example, two antennas oriented in one direction and a third oriented in another direction. The orientations of the UWB antennas may define a field of view for ranging. Such regulation may allow a determination of which direction a user is pointing a mobile device 100a relative to one or more other nearby devices 100b. The field of view may include any one or more of pitch, yaw, or roll angles.

Figure 7:
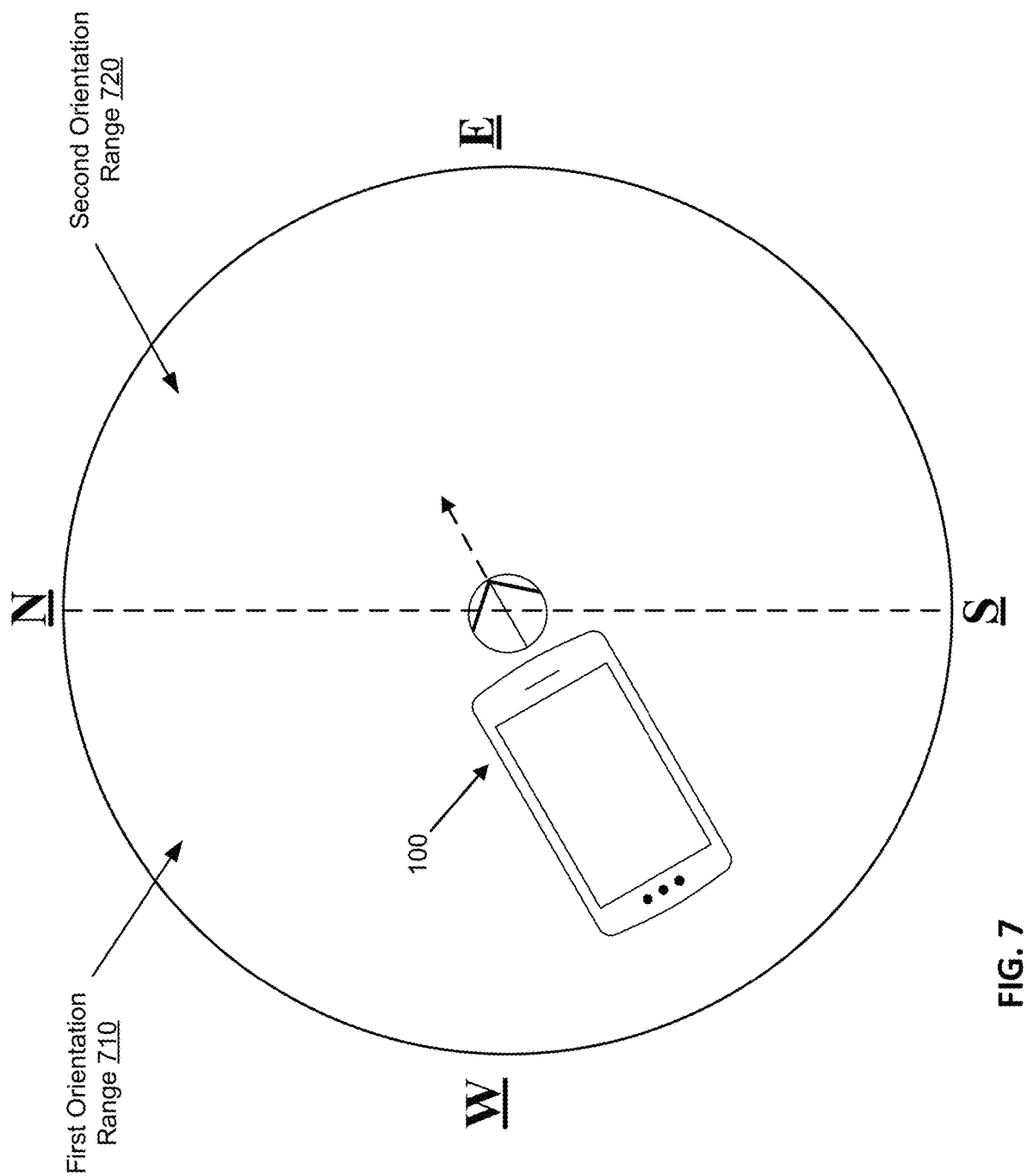
FIG. 7 shows an example of a mobile device configured to operate in an asymmetric communication mode of a wireless protocol based on the orientation of the device, according to embodiments of the present disclosure.

In step 603, the wireless protocol controller 130 of the mobile device 100 may determine an asymmetric communication mode for operating the mobile device 100, based on the orientation of the mobile device 100. In some embodiments, the orientation determined in step 602 may be mapped to a corresponding asymmetric communication mode based on a mapping table, orientation ranges, etc. For example, FIG. 7 shows an example of a mobile device 100 configured to operate in an asymmetric communication mode of a wireless protocol, based on the orientation of the device. In this example, two orientation ranges of 180 degrees have been defined for assigning asymmetric communication modes to mobile devices 100 based on their orientations. The first orientation range 710 covering any west-facing orientation maps to a first asymmetric mode, and the second orientation range 720 covering any east-facing orientation maps to a second asymmetric mode. Although two orientation ranges are shown in this example corresponding to two different asymmetric communication modes, any number of different orientation ranges may be used in other examples. A 2-axis compass covering 360 degrees may be divided into any number of different orientation ranges (e.g., 4 orientation ranges, 6 orientation ranges, etc.), each corresponding to a different asymmetric communication mode. Additionally, in some embodiment, 3-axis device orientation measurements may be used, and the mapping between orientation ranges and asymmetric communication modes may be based on all three dimensions of the mobile device's orientation.

In step 604, the wireless protocol controller 130 of the mobile device 100 may be configured to operate in the particular asymmetric communication mode determined in step 603. In this example, the mobile device 100 would be assigned the second asymmetric communication mode corresponding to the second orientation range 720. The asymmetric modes for orientation ranges 710 and 720 may correspond to a broadcasting mode and a listening mode, or vice versa.

IV. Cycling Between Broadcasting Mode and Passive Mode

As discussed above, when two different mobile devices 100 are configured to operate in the same asymmetric communication mode, these devices may be establish a connection or transfer data. For example, two mobile devices 100a and 100b which are both operating in an asymmetric broadcasting mode of a wireless protocol at the same time, may be unable to detect one another to establish a connection or transfer data. Similarly, if both mobile devices 100a and 100b are both operating in an asymmetric listening mode of the wireless protocol at the same time, they also may be unable to detect one another to establish a connection or transfer data. In order to address the issue of mobile devices 100 operating in incompatible asymmetric communication modes, certain embodiments include configuring mobile devices 100 to periodically switch between asymmetric communication modes.

Figure 8:
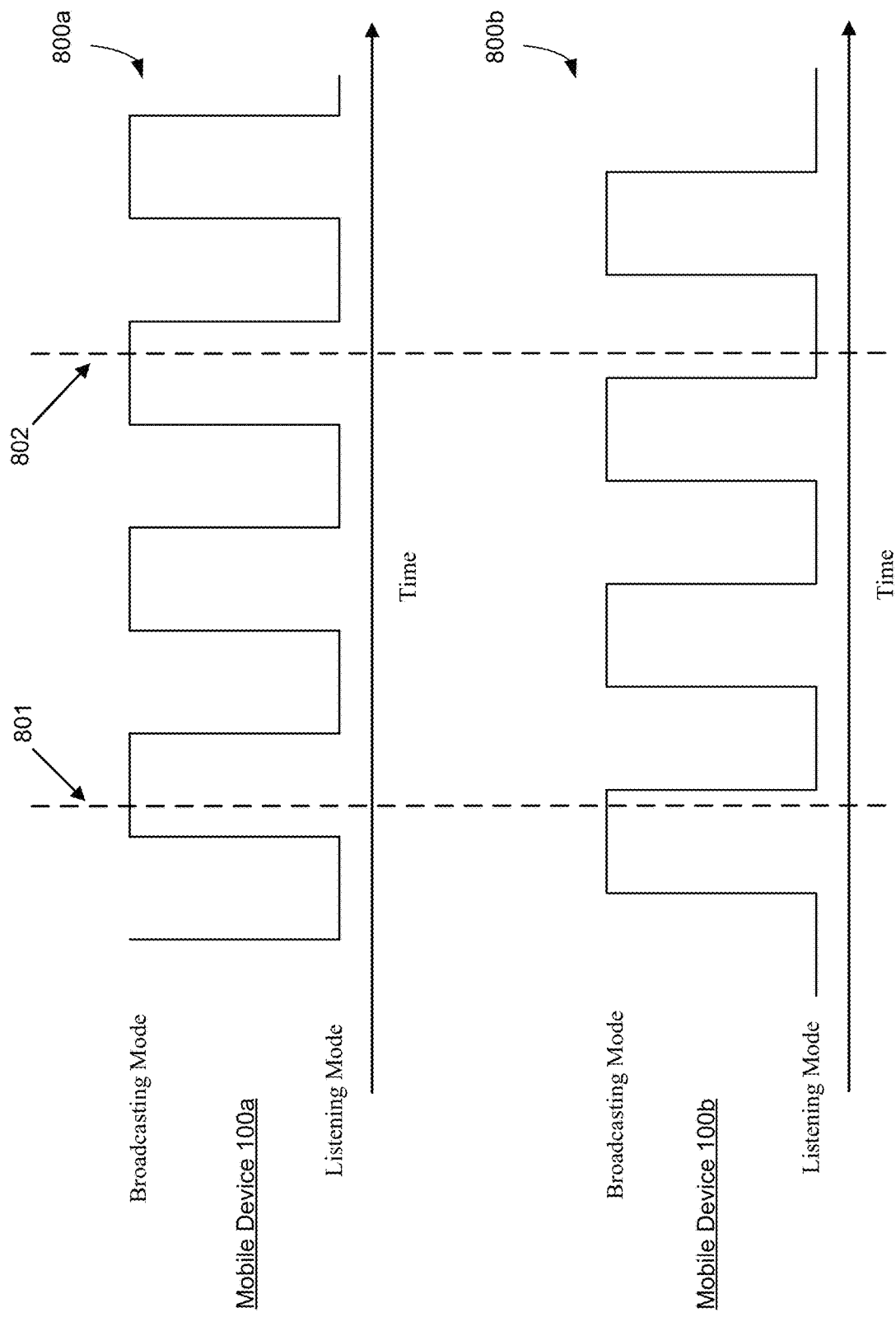
FIG. 8 shows two graphs illustrating mode-switching cycles being performed by two mobile devices, according to embodiments of the present disclosure.

FIG. 8 shows two graphs illustrating mode-switching cycles being performed by two mobile devices, according to embodiments of the present disclosure. In this example, a first graph 800a charts an iterative reconfiguration between asymmetric modes in a first mobile device 100a, as the mobile device 100a switches between the broadcasting mode and the listening mode of the wireless protocol. A second graph 800b charts another iterative reconfiguration between the broadcast and listening asymmetric modes in a second mobile device 100b. Switching periodically between asymmetric communication modes of a wireless protocol as shown in these examples may be referred to as a mode-switching cycle and/or an iterative reconfiguration between modes. In these examples, the mode-switching cycles shown in graphs 800a and 800b are performed at regular intervals. The frequency for a mode-switching cycle may be determined based on the hardware of the mobile device 100. For example, the wireless protocol controller 130 may select the highest mode-switching frequency supported by the wireless communication infrastructure of the mobile device 100.

In the examples of mode-switching cycles shown in FIG. 8, both mobile devices 100a and 100b switch regularly using the same frequency between the same asymmetric communication modes. However, in other embodiments, different mobile devices 100 may cycle at different frequencies and/or may cycle between different numbers of asymmetric communication modes. Additionally, mode-switching need not by performed in cycles at regular intervals based on a predefined frequency as shown in these examples. Instead a wireless protocol controller 130 may implement irregular and/or random switches between different communication modes. In some embodiments, the devices might need to use the same frequency, which may require all devices to use slowest hardware-supported frequency across all supported device models.

Two different points in time are identified in FIG. 8. At time 801, both mobile devices 100a and 100b are operating in broadcasting mode, and thus the devices may be unable to detect each other or establish a communication session at time 801. However, at time 802, mobile device 100a is operating in broadcasting mode while mobile device 100b is operating in listening mode. Therefore, mobile devices 100a and 100b may be able to establish a connection and/or initiate a data transfer at time 802, as long as the mobile devices 100a and 100b stay in compatible modes for a sufficient amount of time to allow the wireless protocol controllers 130 to setup the connection or data transfer.

Figure 9:
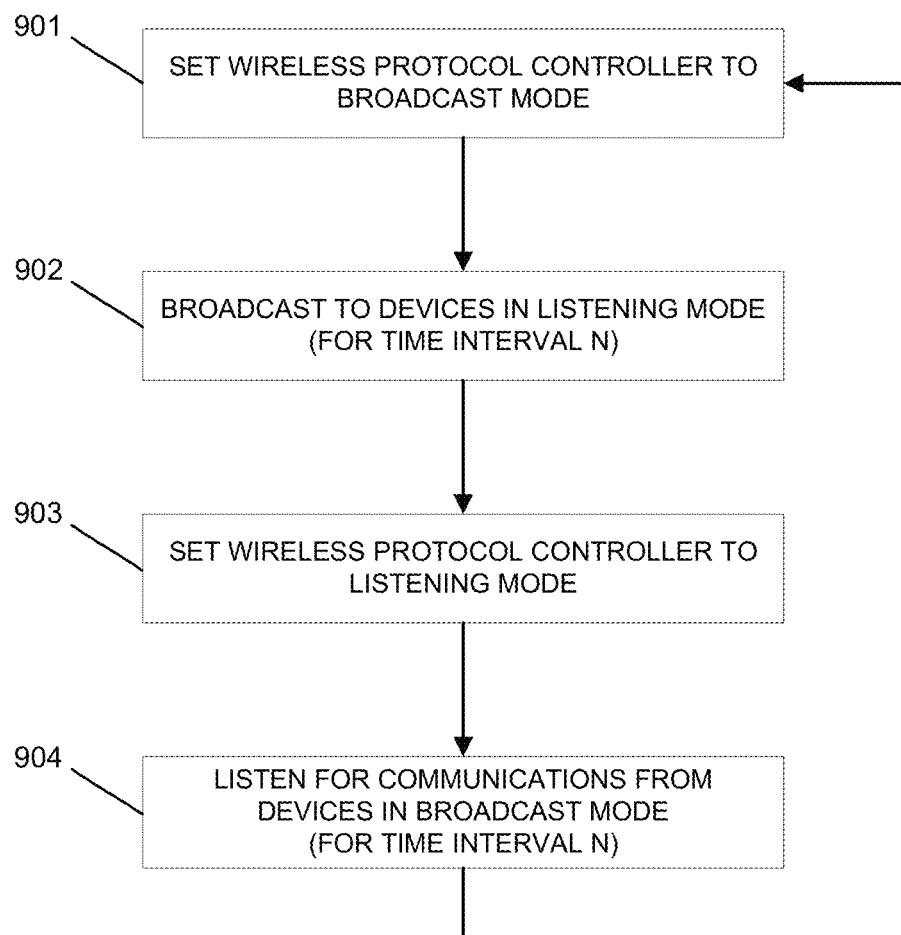
FIG. 9 is a flowchart illustrating a method for performing a mode-switching cycle by a mobile device between different asymmetric communication modes, according to embodiments of the present disclosure.

FIG. 9 is a flowchart illustrating a method for performing a mode-switching cycle by a single mobile device 100, between two different asymmetric communication modes according to embodiments of the present disclosure. In step 901, the wireless protocol controller 130 of the mobile device 100 may be set to a broadcasting mode of the wireless protocol. In step 902, while in broadcasting mode, the wireless protocol controller 130 may be configured to attempt to communicate with one or more other mobile devices 100. Depending on the type of the wireless protocol used, the communication attempt in step 902 may be device detection routine, an attempt to discover and pair with other devices, broadcasts of data to be shared, and/or attempts to connect with and establish network sessions with other devices. After remaining in broadcasting mode for a predetermined period of time in step 902 (e.g., a predefined time interval N), then in step 903 the wireless protocol controller 130 may be reconfigured to a listening mode of the wireless protocol. In step 903, while in listening mode, the wireless protocol controller 130 may be configured to detect communication from other mobile devices 100 operating in a broadcasting mode of the same wireless protocol. Then, after remaining in broadcasting mode for the same predetermined period of time in step 904, the wireless protocol controller 130 may be reconfigured again to the broadcasting mode in step 901.

V. Orientation-Based Cycling

Certain aspects described herein relate to cycling a mobile device between asymmetric communication modes of a wireless protocol, while using the orientation of the mobile device to determine the characteristics of the cycling process. Section III above described techniques for selecting an asymmetric communication mode of a wireless protocol to be used by a mobile device 100, based on the orientation of the mobile device. For example, different mobile devices 100a and 100b facing different directions may be set to different asymmetric modes. Section IV above described a different set of techniques for cycling between asymmetric modes of a wireless protocol. For example, a mobile device 100 may implement a mode-switching cycle, during which the wireless protocol controller 130 of the device 100 may periodically reconfigure between a broadcasting mode and a listening mode. However, as described in these sections, an orientation-based selection of an asymmetric mode need not require cycling between modes, and implement mode-switching cycles need not require any use of device orientation. Thus, the current section describes embodiments which combine aspects from previous sections, including cycling between asymmetric communication modes of a wireless protocol, based on the orientation of the mobile device.

Figure 10:
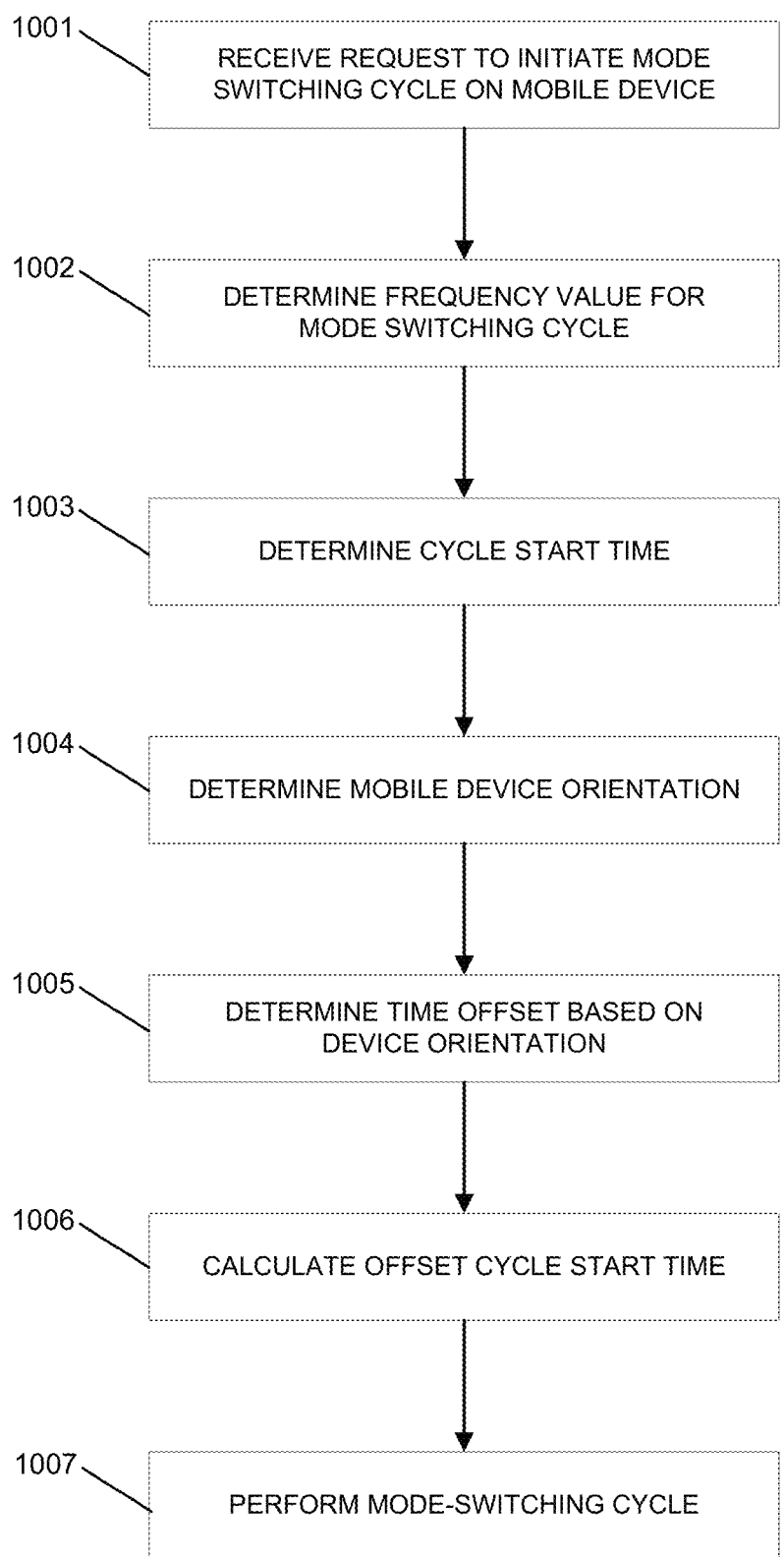
FIG. 10 is a flowchart illustrating a method for performing device orientation-based cycling between asymmetric communication modes of a wireless protocol according to embodiments of the present disclosure.

FIG. 10 is a flowchart illustrating a method for performing device orientation-based cycling between asymmetric communication modes of a wireless protocol according to embodiments of the present disclosure. As described below, determining the characteristics of a mode-switching cycle (or iterative reconfiguration of the mobile device between asymmetric communication modes) may be performed by a wireless protocol controller 130 in conjunction with various other hardware and software systems of a mobile device 100.

In step 1001, a request may be received to initiate a mode-switching cycle on a mobile device 100. Step 1001 may be similar or identical to step 601, discussed above, in which some client process on the mobile device 100 may initiate a request to establish a wireless connection or perform a wireless data transfer with another device. For example, a request to initiate a mode-switching cycle may correspond to a user request to perform a "bump" transfer of contacts or pictures to another nearby device, or to initiate a device search/pairing function to be used for file transfers, data sharing, etc. The request in step 1001 also may be based on a command from the mobile operating system of the device 100, or from a mobile application installed on the device 100. Thus, an end user or client process that causes the request in step 1001 might only be attempting to establish a wireless connection or perform a wireless data transfer, and the underlying techniques used by the wireless protocol controller 130 to establish the connection or perform the transfer (e.g., mode-cycling or not, orientation-based on not, etc.), may be transparent to the end user or client process.

In step 1002, the wireless protocol controller 130 of the mobile device 100 may determine a frequency value for the mode switching cycle. A frequency value for a mode switching cycle may correspond to the length of time between each mode switch. In some embodiments, the wireless protocol controller 130 may determine the frequency for the mode-switching cycle based on the hardware of the mobile device 100. For example, it may be desirable in some embodiments to switch asymmetric communication modes as frequently as possible, to more efficiently connect to another device. In such embodiments, the wireless protocol controller 130 may select the highest possible mode-switching frequency supported by the wireless communication infrastructure of the mobile device 100.

In step 1003, the wireless protocol controller 130 of the mobile device 100 may determine a start time for the mode switching cycle. The cycle start time determined in step 1003 may be an absolute time or a time relative to other events occurring at the mobile device 100 or within the wireless network. In certain embodiments, the system clock of the mobile device 100 may be synchronized with one or other mobile devices 100, and the determined cycle start time may be the same for different mobile devices 100. In other examples, the wireless protocol controllers 130 in different mobile devices 100 may internally synchronize their timing processes, as well as the synchronizing the cycle start times in step 1003, even when the system clocks of their mobile devices 100 are not synchronized.

In step 1004, the wireless protocol controller 130 may determine a current orientation of the mobile device 100. In some cases, the determination of the mobile device orientation in step 1004 may be similar or identical to the orientation determination in step 602, discussed above. For example, the wireless protocol controller 130 may retrieve a reading from one or more internal compass sensors of the mobile device 100. In some cases, data from the compass sensors may be analyzed in conjunction with data from other movement sensors (e.g., gyroscope, accelerometer, etc.) within the mobile device 100.

Additionally, as discussed above, other orientation techniques may be used in other embodiments, including using ranging circuitry within one or more mobile devices 100 to determine the relative distances and orientations between the mobile devices. For example, time-of-flight measurements can be performed using ultra-wideband (UWB) pulses transmitted between two mobile devices 100a and 100b. Ranging may provide distance information, which can be used to determine a relative position of the mobile devices 100, including distances and/or an angular (orientation) differences between the two devices. Thus, in some embodiments the device orientation determined in step 1004 need not be an absolute orientation, but may be an orientation of the mobile device 100a relative to one or more other nearby devices 100b.

In step 1005, the wireless protocol controller 130 may determine a time offset based on the determined orientation of the mobile device 100. As discussed below, a time offset (which also may be referred to as a phase shift) may correspond to the amount of time that a mode-switching cycle is shifted. Accordingly, because the frequency value may correspond to the length of time to complete one switching cycle, then the time offset value determined in step 1005 may correspond to a length of time between zero and the frequency value. In various embodiments, different techniques may be used for determining the time offset value for a mode-switching cycle, based on the device orientation. Two different examples of such techniques are described in the subsections below.

One-Half Frequency Offset for Half of Compass

In some embodiments, determining a time offset value for a mode-switching cycle in step 1005, may include defining two possible orientation ranges of 180 degrees, and applying a one-half frequency offset (e.g., 0.5*frequency value) when the mobile device 100 is oriented within only one of the 180 degree ranges. For example, referring again to FIG. 7, a compass is shown having two separate 180 degree orientation ranges 710 and 720. Applying these orientation ranges to the time offset determination in step 1005, if the orientation of the mobile device 100 falls within the first orientation range 710, then the time offset value may be set to zero, but if the orientation of the mobile device 100 falls within the second orientation range 720, then the time offset value may be set to one-half the frequency value, or vice versa. Thus, this technique for determining time offset values may assure that if two mobile devices 100 are directly facing each other, then a one-half frequency offset may be determined for one of the devices and no offset may be determined for the other device. For devices directly facing each other, this may provide the greatest possible offset between the mode-switching cycles to be performed by the mobile devices 100.

Offset Based on Angular Distance to Fixed Heading

Figure 11:
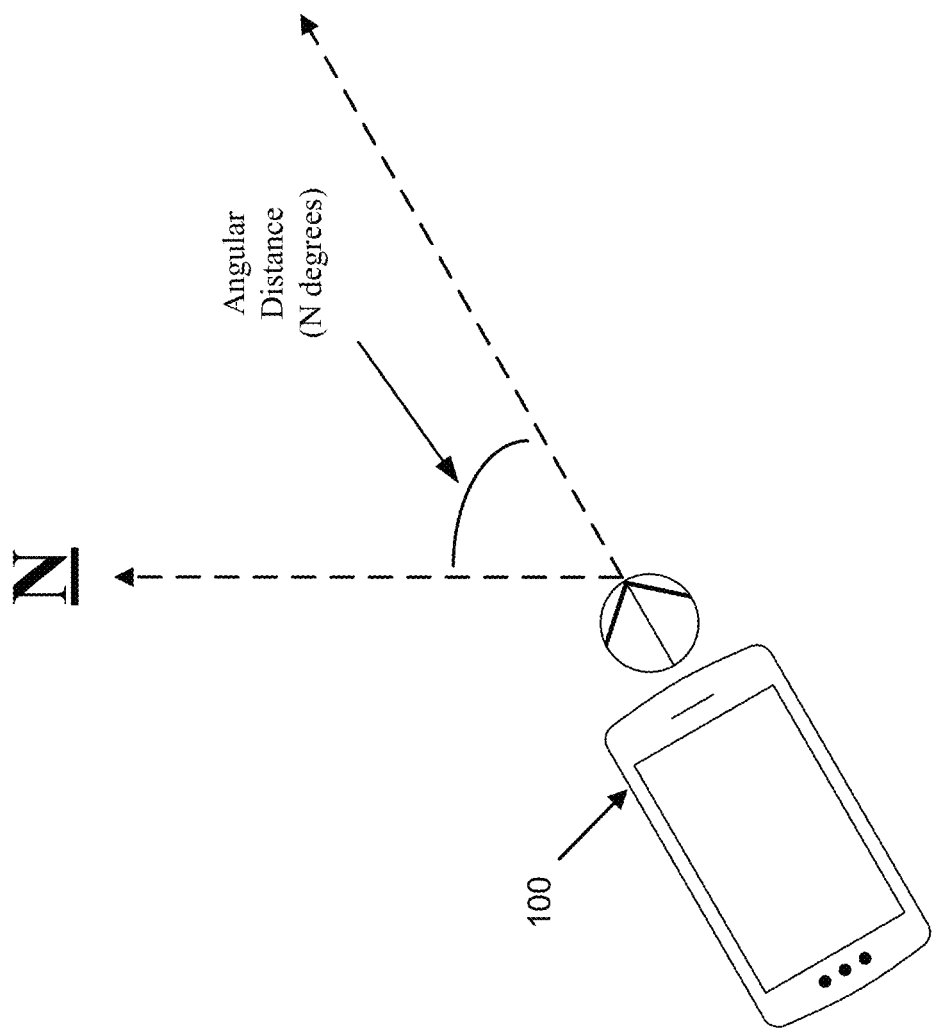
FIG. 11 shows an example of a mobile device oriented at a particular angle which may be used to determine a mode-switching cycle for the mobile device according to embodiments of the present disclosure.

In other embodiments, a time offset value may be determined in step 1005, based on the angular distance between the orientation of the mobile device, and predetermined fixed heading (e.g., magnetic north, or other cardinal direction). Referring now to FIG. 11, an example is shown of a mobile device 100 oriented at an angle of N degrees (e.g., 49 degrees) from due north on the compass. In this example, the wireless protocol controller 130 may determine the time offset value for the mobile device 100, by dividing the angular distance between the device orientation and the predetermined fixed heading over 180 degrees (e.g., 49/180). The resulting value may be multiplied by the frequency value to determine the offset time value. Thus, as with the previous "One-Half Frequency Offset for Half of Compass" technique, if two mobile devices 100 are directly facing each other, then this technique also may provide greatest possible offset between the mode-switching cycles of the mobile devices 100. However, unlike the previous technique, as the two mobile device 100 turn gradually away from direct facing positions, the offset between the mode-switching cycles reduces gradually using this technique.

In step 1006, the wireless protocol controller 130 may calculate an offset start time for the mode switching cycle. In some embodiments, offset start time may be calculated by simply adjusting the cycle start time determined in step 1003 by the amount of the time offset determined in step 1005. Thus, when referring to graphs illustrating mode-switching cycles, such as those shown in FIG. 8, the adjustment of the cycle start time in step 1006 may have the effect of simply shifting the mode-shifting graph left or right by the time offset value determined in step 1005.

In step 1007, the wireless protocol controller 130 may initiate the mode-switching cycle on the mobile device 100. In some embodiments, the initiation of the mode-switching cycle in step 1007 may be similar or identical to performing steps 901-904 in FIG. 9. For instance, wireless protocol controller 130 may initially set the first asymmetric communication mode of the wireless protocol (e.g., broadcasting mode or listening mode), at a time corresponding to the offset cycle start time determined in step 1006. Then the wireless protocol controller 130 may iteratively reconfiguring the mobile device to switching between the broadcasting mode and the listening mode, at time intervals corresponding to the frequency value.

VI. Random Modifications to Cycling

As discussed above, when using asymmetric communication modes of wireless protocols to establish connections and/or transmit data between mobile devices 100, possible difficulties or inefficiencies may result from situations when two different mobile devices 100 are operating in the same asymmetric mode. Such situations of mode incompatibility may occur when cycling between modes is not used, as shown in FIGS. 3A and 3B. Asymmetric mode incompatibility also may occur when mobile devices 100 implement a mode-switching cycle, as shown in FIG. 8 (time 801). Further, when two different mobile devices 100a and 100b implement similar or identical mode-switching cycles (e.g., similar frequencies, cycle start times and time offsets, etc.), it may be possible for the mode-switching cycles of the devices to mirror each other. In such cases, both mobile devices 100a and 100b may switch to broadcasting mode of the wireless protocol at approximately the same time, and then both devices 100a and 100b may switch back to listening mode at approximately the same time, and so on. When the mode-switching cycles of mobile devices 100 closely mirror each other, it may become difficult or impossible to establish wireless connections or transfer data between the devices 100 for an extended period of time. Accordingly, certain embodiments may include random modification of offsets for mode-switching cycles, in order to prevent the mode-switching cycles of different mobile devices 100 from mirroring each other for an extended period.

Figure 12:
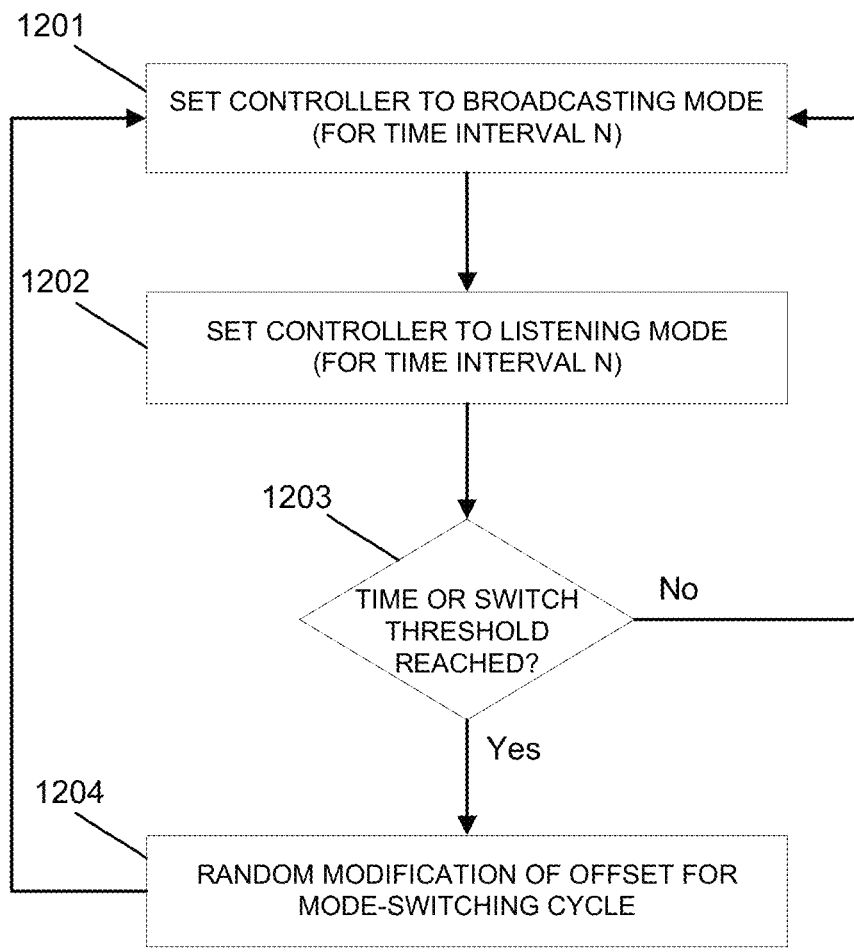
FIG. 12 is a flowchart illustrating a method for performing random modifications of time offset values during mode-switching cycles, according to embodiments of the present disclosure.

FIG. 12 is a flowchart illustrating a method for performing random modifications of time offset values during mode-switching cycles, according to embodiments of the present disclosure. In step 1201, the wireless protocol controller 130 of a mobile device 100 may commence a mode-switching cycle on the mobile device 100, by initially setting the controller to operate in a broadcasting mode of the wireless protocol. Thus, step 1201 may be similar or identical to steps 901-902 described above. After remaining in broadcasting mode for a predetermined period of time in step 1201 (e.g., a predefined time interval N), then in step 1202 the wireless protocol controller 130 may be reconfigured in step 1202 to operate in a listening mode of the wireless protocol for the same length of time. In step 1203, the wireless protocol controller 130 may determine whether to continue the mode-switching cycle of the mobile device 100 without modification (1203: No), or to randomly modify the time offset of the mode-switching cycle (1203: Yes). In some embodiments, step 1203 may including determining whether the mobile device 100 has successfully begun wireless communications with another mobile device 100, and if not, whether a threshold period of time or threshold number of iterations of mode switches has been reached since the beginning of the device's mode-switching cycling. For example, the wireless protocol controller 130 of a mobile device 100 may implement a 0.5 second threshold, meaning that during a mode-switching cycle, if a successful wireless connection and/or data transfer has not occurred after 0.5 seconds (1203: Yes), then the time offset value for the mode-switching cycle may be modified in step 1204. As another example, the wireless protocol controller 130 of a mobile device 100 may implement a 10 cycle threshold, meaning that during a mode-switching cycle, if a successful wireless connection and/or data transfer has not occurred after 100 cycles through the broadcasting and listening modes (1203: Yes), then the time offset value for the mode-switching cycle may be modified in step 1204.

Figure 13:
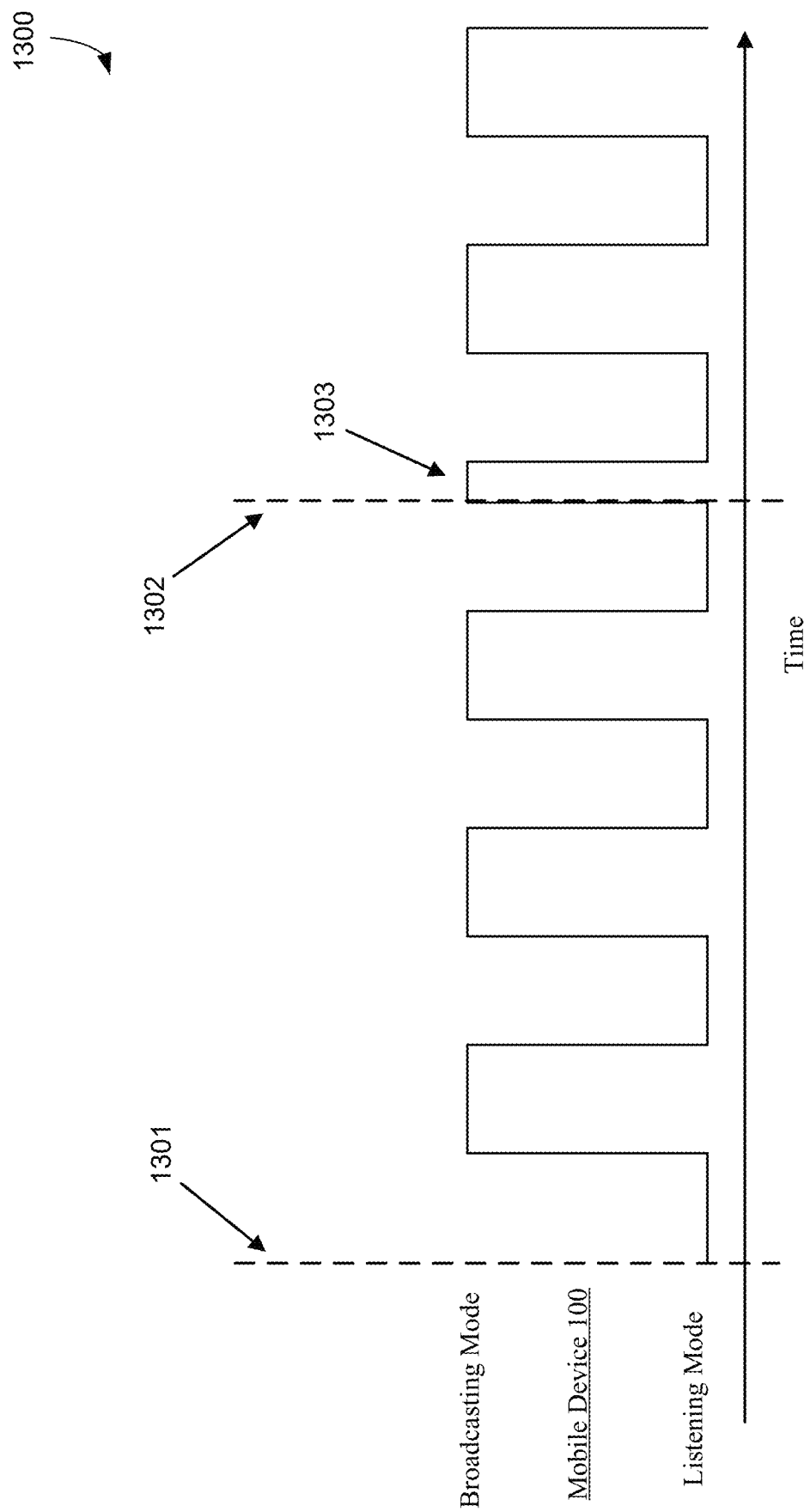
FIG. 13 shows a graph illustrating a mode-switching cycle being performed by a mobile device, according to embodiments of the present disclosure.

In step 1204, the wireless protocol controller 130 may generate a random modification of the time offset value used for the mode-switching cycle, and the reconfigure the mode-switching cycle running on the mobile device 100 based on the modified time offset value. The modified time offset value determined in step 1204 may correspond to a randomly generated value between zero and the frequency value of the mode-switching cycle. Referring briefly to FIG. 13, a graph is shown illustrating a random modification to a mode-switching cycle being performed by a mobile device 100. As shown in this example, a mobile device 100 is performing a mode-switching cycle between an asymmetric broadcasting mode and an asymmetric listening mode of the wireless protocol. The mode-switching cycle began at time 1301 in this example, and a threshold time (or threshold number of mode-switch iterations) was reached at time 1302. Accordingly, at time 1302, rather than continue the mode-switching cycle, a one-time random modification 1303 is applied to the offset time value for the mode-switching cycle. Following the random modification to the offset time value at 1303, the wireless protocol controller 130 may continue with the mode-switching cycle, during which the wireless protocol controller 130 may continue iterating between broadcasting mode and listening mode cycles in an attempts to establish a wireless connection and/or data transfer between other mobile device 100.

VII. Hardware Overview

Figure 14:
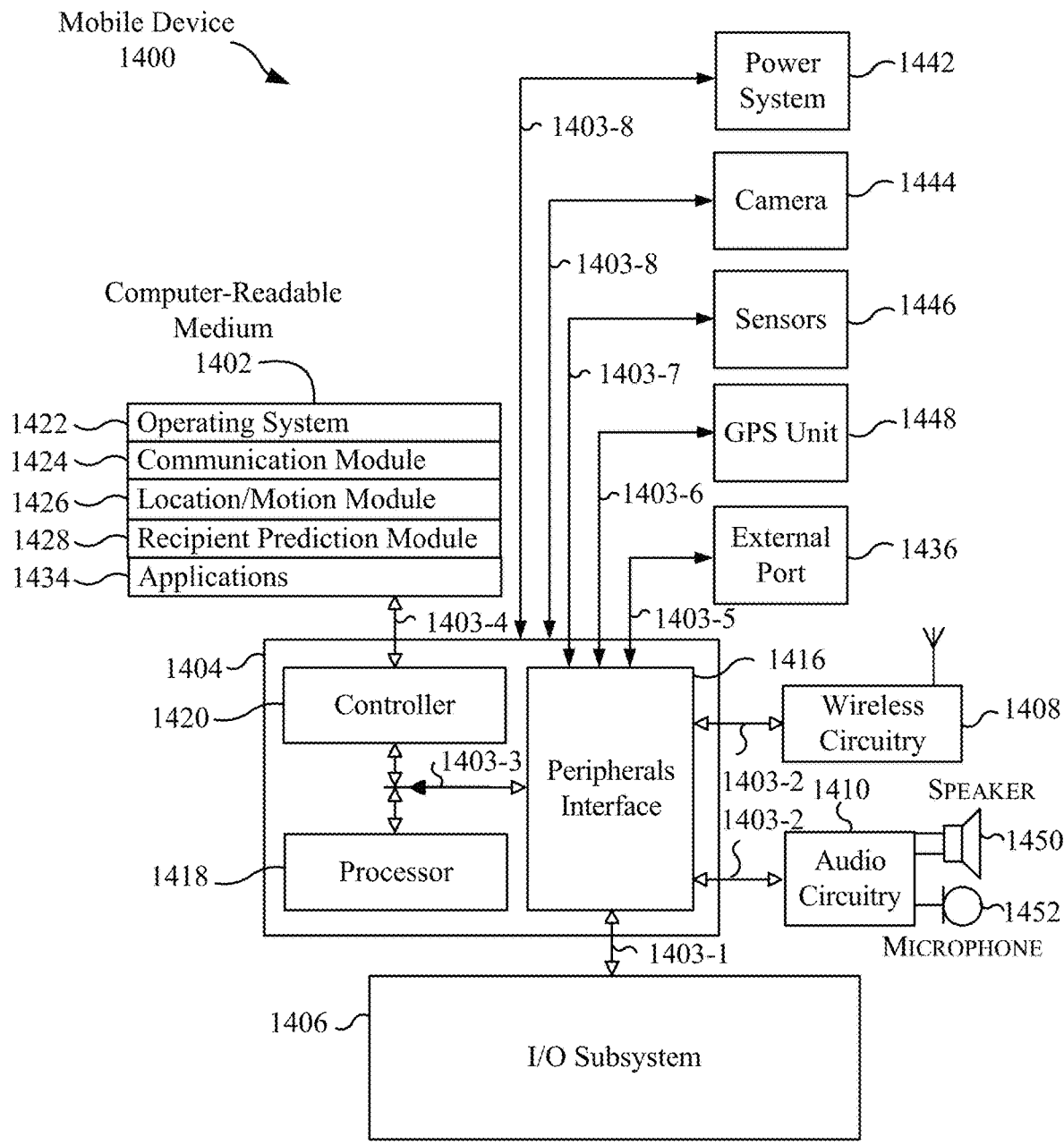
FIG. 14 is a block diagram of an example device according to aspects of the present disclosure.

FIG. 14 is a block diagram of an example electronic device 1400. Device 1400 generally includes computer-readable medium 1402, a processing system 1404, an Input/Output (I/O) subsystem 1406, wireless circuitry 1408, and audio circuitry 1410 including speaker 1412 and microphone 1414. These components may be coupled by one or more communication buses or signal lines 1403. Device 1400 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, a headset, or the like, including a combination of two or more of these items.

It should be apparent that the architecture shown in FIG. 14 is only one example of an architecture for device 1400, and that device 1400 can have more or fewer components than shown, or a different configuration of components. The various components shown in FIG. 14 can be implemented in hardware, software, or a combination of both hardware and software, including one or more signal processing and/or application specific integrated circuits.

Wireless circuitry 1408 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 1408 can use various protocols, e.g., as described herein. In various embodiments, wireless circuitry 1408 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1408 is coupled to processing system 1404 via peripherals interface 1416. Peripherals interface 1416 can include conventional components for establishing and maintaining communication between peripherals and processing system 1404. Voice and data information received by wireless circuitry 1408 (e.g., in speech recognition or voice command applications) is sent to a processing unit having one or more processors 1418 via peripherals interface 1416. One or more processors 1418 are configurable to process various data formats for one or more application programs 1434 stored on medium 1402.

Peripherals interface 1416 couple the input and output peripherals of device 1400 to the one or more processors 1418 and computer-readable medium 1402. One or more processors 1418 communicate with computer-readable medium 1402 via a controller 1420. Computer-readable medium 1402 can be any device or medium that can store code and/or data for use by one or more processors 1418. Computer-readable medium 1402 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 1416, one or more processors 1418, and controller 1420 can be implemented on a single chip, such as processing system 1404. In some other embodiments, they can be implemented on separate chips.

Processor(s) 1418 can include hardware and/or software elements that perform one or more processing functions, such as mathematical operations, logical operations, data manipulation operations, data transfer operations, controlling the reception of user input, controlling output of information to users, or the like. Processor(s) 1418 can be embodied as one or more hardware processors, microprocessors, microcontrollers, field programmable gate arrays (FPGAs), application-specified integrated circuits (ASICs), or the like.

Device 1400 also includes a power system 1442 for powering the various hardware components. Power system 1442 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1400 includes a camera 1444. In some embodiments, device 1400 includes sensors 1446. Sensors can include accelerometers, compass, gyroscope, pressure sensors, audio sensors, light sensors, barometers, and the like. Sensors 1446 can be used to sense location aspects, such as auditory or light signatures of a location.

In some embodiments, device 1400 can include a GPS receiver, sometimes referred to as a GPS unit 1448. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1418 run various software components stored in medium 1402 to perform various functions for device 1400. In some embodiments, the software components include an operating system 1422, a communication module 1424 (or set of instructions), a location module 1426 (or set of instructions), a settings module 1428 that is used as part of determining settings (e.g., a playback buffer size) described herein, and other application programs 1434 (or set of instructions).

Operating system 1422 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1424 facilitates communication with other devices over one or more external ports 1436 or via wireless circuitry 1408 and includes various software components for handling data received from wireless circuitry 1408 and/or external port 1436. External port 1436 (e.g., USB, FireWire, Lightning connector, 60-pin connector, etc.) is adapted for coupling directly to other devices or indirectly over a network (e.g., the Internet, wireless LAN, etc.).

Location/motion module 1426 can assist in determining the current position (e.g., coordinates or other geographic location identifiers) and motion of device 1400. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1426 receives data from GPS unit 1448 and analyzes the signals to determine the current position of the mobile device. In some embodiments, location/motion module 1426 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1408 and is passed to location/motion module 1426. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1400 based on the position coordinates of the corresponding transmitters. Regardless of the specific location technology used, location/motion module 1426 receives information from which a location fix can be derived, interprets that information, and returns location information, such as geographic coordinates, latitude/longitude, or other location fix data A settings module 1428 can determine settings of mobile device 1400 and/or of other devices (e.g., a playback device) in communication with device 1400. For example, settings module 1428 can determine a buffer size of a playback (jitter) buffer of a playback device. Settings module 1428 can make the determination based on information obtained from other components of device 1400, e.g., from wireless circuitry 1408, which may correspond to a wireless interface. Settings module 1428 can communicate with various application programs 1434, e.g., ones that provide streaming content. For example, settings module 1428 can cause a change in a rate that streamlining content is provide from an application. In some embodiments, settings module 1428 can also include a timing module or cause a timing module to provide a sped up or slowed down clock signal to a streaming application.

The one or more applications 1434 on device 1400 can include any applications installed on the device 1400, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 1406 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1406 can include a display and user input devices such as a keyboard, mouse, and/or trackpad. In some embodiments, I/O subsystem 1406 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1402) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1406 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1400 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art Further, as described above, one aspect of the present technology is the gathering and use of data available from various sources to improve establishing wireless communications between mobile devices using wireless protocols. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data such as device locations and orientations may be used to establish wireless communications for wireless data transfers. Accordingly, use of such personal information data enables users to more efficiently connect devices and share data. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of establishing wireless communications based on mobile device orientation, the present technology can be configured to allow users to select to "opt in" or "opt out" of participation in the collection of personal information data during registration for services or anytime thereafter. In another example, users may select not to provide data corresponding to their mobile device locations or orientations, or previous interactions with various applications, along with their sharing preferences and/or historical user interactions. In yet another example, users can select to limit the length of time that mobile device locations and orientations, previous application interactions and sharing data is maintained or entirely prohibit the collection and tracking of such data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, wireless communications may be established between mobile devices based on non-personal information data or a bare minimum amount of personal information, or publicly available information.

What is claimed is:

1. A method comprising:
    performing, by a first device:
        receiving a request from a second device to initiate wireless communications using a wireless protocol, wherein the wireless protocol supports at least two asymmetric communication modes;
        selecting a first asymmetric communication mode of the at least two asymmetric communication modes of the wireless protocol based on ranging information generated by ranging circuitry of the first device; and
        configuring the first device to communicate with the second device in the selected first asymmetric communication mode of the at least two asymmetric communication modes of the wireless protocol.

2. The method of claim 1, wherein the ranging information includes an angular orientation between the first device and the second device, and wherein selecting the first asymmetric communication mode of the wireless protocol comprises:
    comparing the angular orientation between the first device and the second device to a specified angular orientation range; and
    selecting the first asymmetric communication mode of the at least two asymmetric communication modes of the wireless protocol based on whether the first device is oriented within the specified angular orientation range.

3. The method of claim 1, further comprising:
    obtaining the ranging information by transmitting ultra-wideband (UWB) pulses between the first device and the second device.

4. The method of claim 1, further comprising:
    after configuring the first device to communicate in the selected first asymmetric communication mode of the wireless protocol, performing a mode-switching cycle on the first device, wherein performing the mode-switching cycle comprises iteratively reconfiguring the first device between communicating in the first asymmetric communication mode and a second asymmetric communication mode of the at least two asymmetric communication modes of the wireless protocol.

5. The method of claim 4, wherein performing the mode-switching cycle on the first device comprises:
    determining a frequency value corresponding to a length of time between each mode switch in the mode-switching cycle;
    determining a cycle start time value for the mode-switching cycle;
    determining a time offset value for the mode-switching cycle based on the ranging information of the first device, wherein the time offset value corresponds to a value between zero and the length of time of the frequency value;
    calculating an offset cycle start time value based on the cycle start time value and the time offset value;

at a time corresponding to the offset cycle start time value, configuring the first device to communicate in the selected first asymmetric communication mode of the wireless protocol; and iteratively reconfiguring the first device between communicating in the first asymmetric communication mode and the second asymmetric communication mode of the wireless protocol, at time intervals corresponding to the frequency value.

6. The method of claim 5, wherein the ranging information includes an angular orientation between the first device and the second device, and wherein determining the time offset value for the mode-switching cycle based on the ranging information of the first device comprises:

determining an angular distance between the angular orientation of the first device and a specified angular orientation range; and calculating the time offset value based on the angular distance between the angular orientation of the first device and the specified angular orientation range.

7. The method of claim 5, wherein performing the mode-switching cycle on the first device further comprises:

determining that the first device has not established a connection with the second device via the wireless protocol, within at least one of a threshold period of time or within a threshold number of iterations; and in response to said determination, modifying the offset cycle start time value, and continuing the mode-switching cycle using the modified offset cycle start time value.

8. A computing device, comprising:

a processing unit comprising one or more processors;

memory coupled with and readable by the processing unit and storing therein a set of instructions which, when executed by the processing unit, causes the computing device to:

receive a request from a second computing device to initiate wireless communications using a wireless protocol, wherein the wireless protocol supports at least two asymmetric communication modes;

select a first asymmetric communication mode of the at least two asymmetric communication modes of the wireless protocol based on ranging information generated by ranging circuitry of the computing device; and configure the computing device to communicate with the second computing device in the selected first asymmetric communication mode of the at least two asymmetric communication modes of the wireless protocol.

9. The computing device of claim 8, wherein the ranging information includes an angular orientation between the computing device and the second computing device, and wherein selecting the first asymmetric communication mode of the wireless protocol comprises:

comparing the angular orientation between the computing device and the second computing device to a specified angular orientation range; and selecting the first asymmetric communication mode of the at least two asymmetric communication modes of the wireless protocol based on whether the computing device is oriented within the specified angular orientation range.

10. The computing device of claim 8, further comprising:

obtaining the ranging information by transmitting ultra-wideband (UWB) pulses between the computing device and the second computing device.

11. The computing device of claim 8, the memory storing therein additional instructions which, when executed by the processing unit, causes the computing device:

after configuring the computing device to communicate in the selected first asymmetric communication mode of the wireless protocol, perform a mode-switching cycle on the computing device, wherein performing the mode-switching cycle comprises iteratively reconfiguring the computing device between communicating in the first asymmetric communication mode and a second asymmetric communication mode of the at least two asymmetric communication modes of the wireless protocol.

12. The computing device of claim 11, wherein performing the mode-switching cycle on the computing device comprises:

determining a frequency value corresponding to a length of time between each mode switch in the mode-switching cycle;

determining a cycle start time value for the mode-switching cycle;

determining a time offset value for the mode-switching cycle based on the ranging information of the computing device, wherein the time offset value corresponds to a value between zero and the length of time of the frequency value;

calculating an offset cycle start time value based on the cycle start time value and the time offset value;

at a time corresponding to the offset cycle start time value, configuring the computing device to communicate in the selected first asymmetric communication mode of the wireless protocol; and iteratively reconfiguring the computing device between communicating in the first asymmetric communication mode and the second asymmetric communication mode of the wireless protocol, at time intervals corresponding to the frequency value.

13. The computing device of claim 12, wherein the ranging information includes an angular orientation between the computing device and the second computing device, and wherein determining the time offset value for the mode-switching cycle based on the ranging information of the computing device comprises:

determining an angular distance between the angular orientation of the computing device and a specified angular orientation range; and calculating the time offset value based on the angular distance between the angular orientation of the computing device and the specified angular orientation range.

14. The computing device of claim 12, wherein performing the mode-switching cycle on the computing device further comprises:

determining that the computing device has not established a connection with the second computing device via the wireless protocol, within at least one of a threshold period of time or within a threshold number of iterations; and in response to said determination, modifying the offset cycle start time value, and continuing the mode-switching cycle using the modified offset cycle start time value.

15. A non-transitory computer-readable storage medium storing computer-executable instructions that, when executed by one or more processors of a computing device, cause the one or more processors to:

receive a request from a second computing device to initiate wireless communications using a wireless protocol, wherein the wireless protocol supports at least two asymmetric communication modes;

select a first asymmetric communication mode of the at least two asymmetric communication modes of the wireless protocol based on ranging information generated by ranging circuitry of the computing device; and configure the computing device to communicate with the second computing device in the selected first asymmetric communication mode of the at least two asymmetric communication modes of the wireless protocol.

16. The computer-readable storage medium of claim 15, wherein the ranging information includes an angular orientation between the computing device and the second computing device, and wherein selecting the first asymmetric communication mode of the wireless protocol comprises:

comparing the angular orientation between the computing device and the second computing device to a specified angular orientation range; and selecting the first asymmetric communication mode of the at least two asymmetric communication modes of the wireless protocol based on whether the computing device is oriented within the specified angular orientation range.

17. The computing device of claim 15, further comprising:

obtaining the ranging information by transmitting ultra-wideband (UWB) pulses between the computing device and the second computing device.

18. The computer-readable storage medium of claim 15, the computer-executable instructions further causing the computing device:

after configuring the computing device to communicate in the selected first asymmetric communication mode of the wireless protocol, perform a mode-switching cycle on the computing device, wherein performing the mode-switching cycle comprises iteratively reconfiguring the computing device between communicating in the first asymmetric communication mode and a second asymmetric communication mode of the at least two asymmetric communication modes of the wireless protocol.

19. The computer-readable storage medium of claim 18, wherein performing the mode-switching cycle on the computing device comprises:

determining a frequency value corresponding to a length of time between each mode switch in the mode-switching cycle;

determining a cycle start time value for the mode-switching cycle;

determining a time offset value for the mode-switching cycle based on the ranging information of the computing device, wherein the time offset value corresponds to a value between zero and the length of time of the frequency value;

calculating an offset cycle start time value based on the cycle start time value and the time offset value;

at a time corresponding to the offset cycle start time value, configuring the computing device to communicate in the selected first asymmetric communication mode of the wireless protocol; and iteratively reconfiguring the computing device between communicating in the first asymmetric communication mode and the second asymmetric communication mode of the wireless protocol, at time intervals corresponding to the frequency value.

20. The computer-readable storage medium of claim 19, wherein the ranging information includes an angular orientation between the computing device and the second computing device, and wherein determining the time offset value for the mode-switching cycle based on the angular orientation of the computing device comprises:

determining an angular distance between the angular orientation of the computing device and a specified angular orientation range; and calculating the time offset value based on the angular distance between the angular orientation of the computing device and the specified angular orientation range.

* * * * *